(12) United States Patent
Ogura et al.

(10) Patent No.: US 9,751,793 B2
(45) Date of Patent: Sep. 5, 2017

(54) METHOD OF MANUFACTURING GLASS MOLDED PRODUCT AND LOWER DIE FOR MOLDING GLASS

(71) Applicant: KONICA MINOLTA, INC., Tokyo (JP)

(72) Inventors: Kazuyuki Ogura, Yao (JP); Yoshihiro Kamada, Osaka (JP); Tadafumi Sakata, Kobe (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/400,808

(22) PCT Filed: May 9, 2013

(86) PCT No.: PCT/JP2013/063026
§ 371 (c)(1),
(2) Date: Nov. 13, 2014

(87) PCT Pub. No.: WO2013/172245
PCT Pub. Date: Nov. 21, 2013

(65) Prior Publication Data
US 2015/0135771 A1    May 21, 2015

(30) Foreign Application Priority Data

May 15, 2012    (JP) ................................ 2012-111493

(51) Int. Cl.
| | |
|---|---|
| *C03B 9/08* | (2006.01) |
| *C03B 11/08* | (2006.01) |
| *C03B 11/16* | (2006.01) |

(52) U.S. Cl.
CPC .............. *C03B 11/08* (2013.01); *C03B 11/16* (2013.01); *C03B 2215/11* (2013.01);
(Continued)

(58) Field of Classification Search
CPC .. C03B 11/08; C03B 2215/50; C03B 2215/60
(Continued)

(56) References Cited

U.S. PATENT DOCUMENTS

2003/0056541 A1\* 3/2003 Mukasa ................. C03B 11/08
65/39
2008/0032137 A1    2/2008 Ikenaga et al.

FOREIGN PATENT DOCUMENTS

| JP | 2000-001322 A | 1/2000 |
|---|---|---|
| JP | 2002-012431 A | 1/2002 |

(Continued)

OTHER PUBLICATIONS

International Search Report in International Application No. PCT/JP2013/063026, dated Jun. 11, 2013, 3 pages.
(Continued)

*Primary Examiner* — Cynthia Szewczyk
(74) *Attorney, Agent, or Firm* — Brinks Gilson & Lione

(57) ABSTRACT

A method of manufacturing a glass molded product includes the steps of preparing a lower die including a lower die surface and a space forming surface formed to extend downward away from an outer edge end portion of the lower die surface with the outer edge end portion being defined as a starting point, preparing an outer frame including an annularly formed inner circumferential surface, arranging the lower die on an inner side of the outer frame, dropping a prescribed amount of molten glass droplet onto the lower die surface such that a surface of the molten glass droplet connects the outer edge end portion and a portion of the inner circumferential surface located above a position of the outer edge end portion to each other and the molten glass droplet does not wet-spread over the space forming surface, and pressurizing and molding the molten glass droplet.

10 Claims, 29 Drawing Sheets

(52) U.S. Cl.
CPC ...... *C03B 2215/12* (2013.01); *C03B 2215/50* (2013.01); *C03B 2215/61* (2013.01); *C03B 2215/73* (2013.01)

(58) Field of Classification Search
USPC .......................................................... 65/29.1
See application file for complete search history.

(56) References Cited

FOREIGN PATENT DOCUMENTS

| | | |
|---|---|---|
| JP | 2002-020130 A | 1/2002 |
| JP | 2008-037703 A | 2/2008 |

OTHER PUBLICATIONS

Notification of First Office Action from the State Intellectual Property Office of People's Republic of China issued in Chinese Patent Application No. 201380023946.3 on Dec. 2, 2015, with English-language translation, 22 pages.

\* cited by examiner

FIG.3
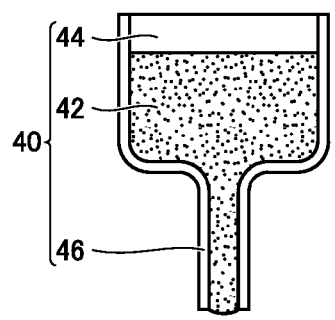
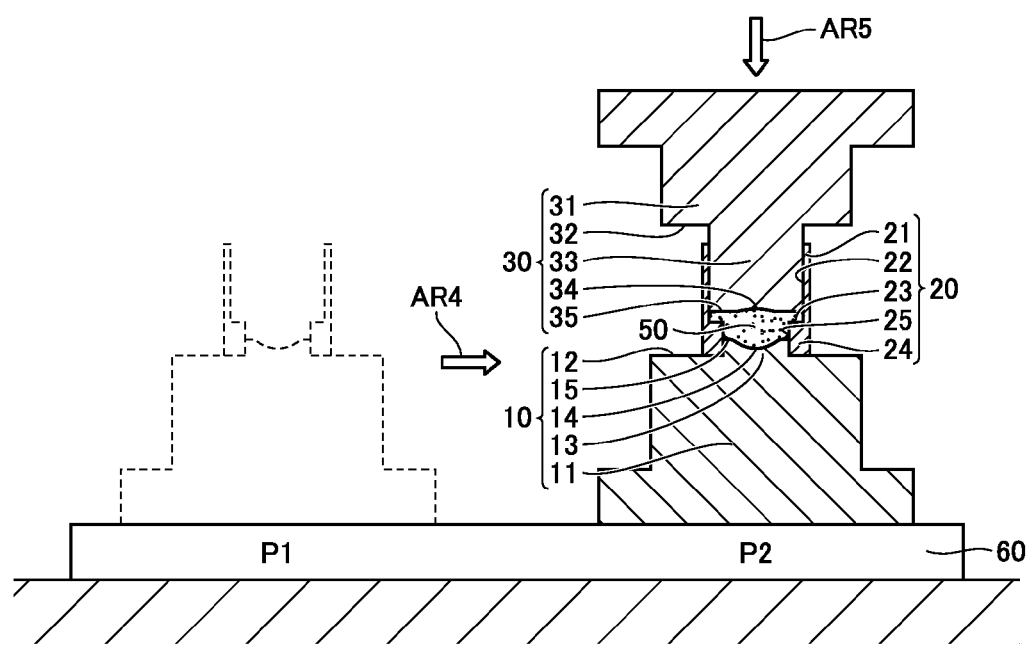

METHOD OF MANUFACTURING GLASS MOLDED PRODUCT AND LOWER DIE FOR MOLDING GLASS

This application is a National Stage application of International Application No. PCT/JP2013/063026, filed May 9, 2013.

BACKGROUND

1. Technical Field Text

The present invention relates to a method of manufacturing a glass molded product and a lower die for molding glass, and particularly to a method of manufacturing a glass molded product by pressurizing and molding a molten glass droplet with the use of an upper die, an outer frame, and a lower die, and a lower die for molding glass.

2. Background Information

As disclosed in Japanese Laid-Open Patent Publication No. 2008-037703 (PTD 1), a method of manufacturing a glass molded product by pressurizing and molding a molten glass droplet has been known. The glass molded product is used, for example, as an optical element, for a digital camera lens, an optical pickup lens for a digital versatile disc (DVD), a camera lens for a mobile phone, and a coupling lens for optical communication.

Recently, an optical device for which a glass molded product is employed tends to be smaller in size and also higher in performance. Performance required for the glass molded product (for example, shape accuracy) also tends to be higher. Such a glass molded product can be manufactured by pressurizing and molding a molten glass droplet dropped onto a lower die downward from above, with the use of an upper die, an outer frame, and a lower die.

In the method of manufacturing a glass molded product disclosed in Japanese Laid-Open Patent Publication No. 2008-037703 (PTD 1), an outer frame is employed as one of molding dies. In this case, the outer frame is removed from the glass molded product after the pressurizing and molding step. The outer frame may also be used as a part of a component, together with a glass molded product. In this case, the outer frame is not removed from the glass molded product but the outer frame is used for an optical device together with the glass molded product.

CITATION LIST

Patent Document

PTD 1: Japanese Laid-Open Patent Publication No. 2008-037703

BRIEF SUMMARY

Summary of Invention

Technical Problem

A molten glass droplet dropped toward a lower die comes in contact with the lower die and an outer frame. The molten glass droplet is deprived of heat by the lower die and the outer frame and a temperature of the molten glass droplet rapidly lowers. A rate of lowering in a temperature of the molten glass droplet varies depending on an area of contact between the molten glass droplet and the lower die and an area of contact between the molten glass droplet and the outer frame. A greater area of contact leads to a higher rate of lowering in a temperature of the molten glass droplet. A smaller area of contact leads to a lower rate of lowering in a temperature of the molten glass droplet.

After lapse of a prescribed period of time since supply of the molten glass droplet onto the lower die, the molten glass droplet is pressurized and molded with the use of an upper die. In general, the timing to start pressurization and molding (timing of pressing) is determined in advance through experiments. When a plurality of times of pressurization and molding are consecutively performed, the timing of pressing is set to a constant value and the timing of pressing is hardly adjusted each time of pressurization and molding.

Viscosity of a molten glass droplet varies depending on a temperature of the molten glass droplet. Viscosity of the molten glass droplet at the time of start of pressurization and molding affects performance of a glass molded product obtained by pressurization and molding. Therefore, in order to suppress generation of individual difference in performance among a plurality of glass molded products obtained as finished products, viscosity of the molten glass droplet pressurized at prescribed timing of pressing preferably does not vary each time of a plurality of times of pressurization and molding (in other words, there is no variation in viscosity of the molten glass droplet each time of pressurization and molding performed a plurality of times).

The present invention was created in view of the circumstances as above, and an object thereof is to obtain a method of manufacturing a glass molded product capable of achieving suppression of generation of individual difference in performance among a plurality of glass molded products obtained as finished products and a lower die for molding glass.

Solution to Problem

A method of manufacturing a glass molded product based on a first aspect of the present invention is a method of manufacturing a glass molded product by pressurizing and molding a molten glass droplet dropped downward from above, which includes the steps of preparing a lower die including a lower die surface onto which the molten glass droplet is dropped and a first space forming surface formed to extend downward away from an outer edge end portion of the lower die surface, with the outer edge end portion being defined as a starting point, preparing an outer frame including an annularly formed inner circumferential surface, arranging the lower die on an inner side of the outer frame so as to form a space between the first space forming surface and the inner circumferential surface, dropping a prescribed amount of the molten glass droplet onto the lower die surface such that a surface of the molten glass droplet dropped onto the lower die surface connects the outer edge end portion and a portion of the inner circumferential surface located above a position of the outer edge end portion to each other and the molten glass droplet dropped onto the lower die surface does not wet-spread over the first space forming surface, and pressurizing and molding the molten glass droplet by using the lower die, the outer frame, and an upper die after lapse of a prescribed period of time since drop of the molten glass droplet onto the lower die surface.

Preferably, the prescribed amount of the molten glass droplet is dropped onto the lower die surface such that the molten glass droplet wet-spreads over the lower die surface and reaches an entire circumference of the outer edge end portion.

A method of manufacturing a glass molded product based on a second aspect of the present invention is a method of manufacturing a glass molded product by pressurizing and molding a molten glass droplet dropped downward from above, which includes the steps of preparing a lower die including a lower die surface onto which the molten glass droplet is dropped, preparing an outer frame including an annularly formed inner circumferential surface and a second space forming surface formed to extend outward away from a lower end portion of the inner circumferential surface, with the lower end portion being defined as a starting point, arranging the lower die on an inner side of the outer frame such that the lower die surface is located below the lower end portion and a space is formed between the lower die surface and the lower end portion, dropping a prescribed amount of the molten glass droplet onto the lower die surface such that a surface of the molten glass droplet dropped onto the lower die surface connects the lower end portion and a portion of the lower die surface located on the inner side relative to a position of the lower end portion to each other and the molten glass droplet dropped onto the lower die surface does not wet-spread over the second space forming surface, and pressurizing and molding the molten glass droplet by using the lower die, the outer frame, and an upper die after lapse of a prescribed period of time since drop of the molten glass droplet onto the lower die surface.

Preferably, an angle formed with respect to a direction of gravity by a straight line connecting an upper end and a lower end to each other of the surface of the molten glass droplet which connects the lower end portion and the portion of the lower die surface located on the inner side relative to the position of the lower end portion to each other is not smaller than 20° and smaller than 45°.

A method of manufacturing a glass molded product based on a third aspect of the present invention is a method of manufacturing a glass molded product by pressurizing and molding a molten glass droplet dropped downward from above, which includes the steps of preparing a lower die including a lower die surface onto which the molten glass droplet is dropped and a first space forming surface formed to extend downward away from an outer edge end portion of the lower die surface, with the outer edge end portion being defined as a starting point, preparing an outer frame including an annularly formed inner circumferential surface and a second space forming surface formed to extend outward away from a lower end portion of the inner circumferential surface, with the lower end portion being defined as a starting point, arranging the lower die on an inner side of the outer frame such that the outer edge end portion is located below the lower end portion and a space is formed between the outer edge end portion and the inner circumferential surface and between the lower die surface and the lower end portion, dropping a prescribed amount of the molten glass droplet onto the lower die surface such that a surface of the molten glass droplet dropped onto the lower die surface connects the outer edge end portion and the lower end portion to each other and the molten glass droplet dropped onto the lower die surface does not wet-spread over any of the first space forming surface and the second space forming surface, and pressurizing and molding the molten glass droplet by using the lower die, the outer frame, and an upper die after lapse of a prescribed period of time since drop of the molten glass droplet onto the lower die surface.

Preferably, the lower die and the outer frame each have a shape in rotation symmetry with respect to each central axis.

A lower die for molding glass based on the present invention is a lower die for molding glass, for molding a glass molded product, which includes a base portion, a molding portion protruding upward from the base portion, a molding surface formed on an upper surface of the molding portion and including a lower die surface in a recessed shape and an outer edge end portion located on an outer side of the lower die surface, and an outer frame including an annularly formed inner circumferential surface, the molding portion being arranged to be located on an inner side of the inner circumferential surface, and a first space forming surface is formed to extend downward away from the outer edge end portion of the molding surface with the outer edge end portion being defined as a starting point, or a second space forming surface is formed to extend outward away from a lower end portion of the inner circumferential surface of the outer frame with the lower end portion being defined as a starting point.

Advantageous Effects of Invention

According to the present invention, a method of manufacturing a glass molded product capable of achieving suppression of generation of individual difference in performance among a plurality of glass molded products obtained as finished products and a lower die for molding glass are obtained.

BRIEF DESCRIPTION OF THE DRAWINGS

FIG. 3 is a cross-sectional view showing a third step of the method of manufacturing a glass molded product in the comparative example.

DETAILED DESCRIPTION OF THE DRAWINGS AND THE PRESENTLY PREFERRED EMBODIMENTS

Description of Embodiments

Comparative Example

Figure 1:
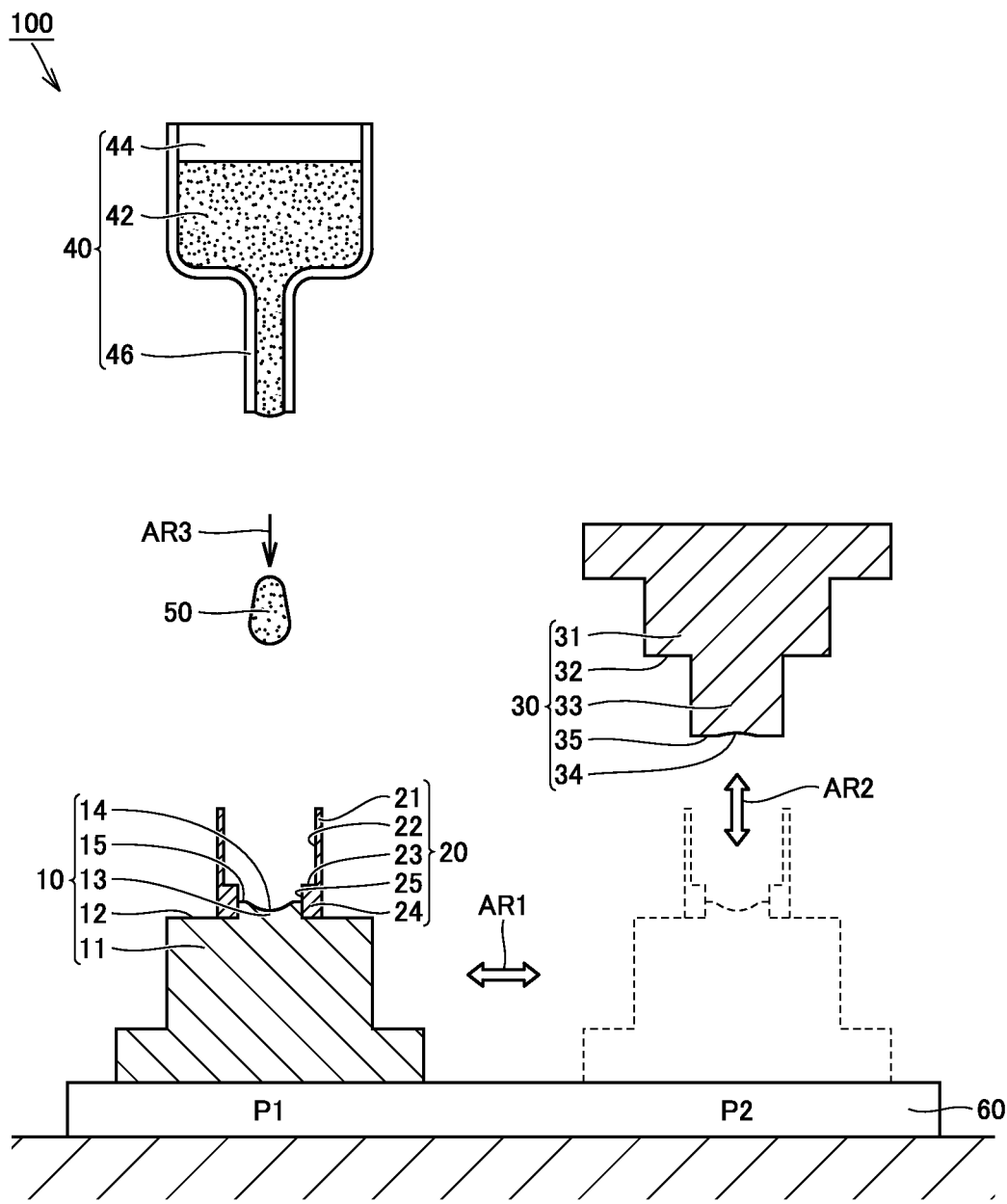
FIG. 1 is a cross-sectional view showing an apparatus for manufacturing a glass molded product used in a method of manufacturing a glass molded product in a comparative example and a first step of the method of manufacturing a glass molded product in the comparative example.

Prior to description of each embodiment based on the present invention, a comparative example in connection with the present invention will be described with reference to FIGS. 1 to 6. In the description of the comparative example, the same or corresponding elements have the same reference characters allotted and redundant description may not be repeated.

Apparatus 100 for Manufacturing Glass Molded Product

Referring to FIG. 1, in a method of manufacturing a glass molded product in the comparative example, an apparatus 100 for manufacturing a glass molded product is prepared and used. Apparatus 100 for manufacturing a glass molded product includes a lower die 10, an outer frame 20, an upper die 30, and a dropping apparatus 40. Though details will be described later, apparatus 100 for manufacturing a glass molded product obtains a glass molded product by pressurizing and molding a molten glass droplet 50 dropped from dropping apparatus 40 toward lower die 10, with the use of lower die 10, outer frame 20, and upper die 30.

Lower Die 10

Lower die 10 includes a base portion 11 and a molding portion 13. Molding portion 13 has a columnar shape and protrudes upward from an upper surface 12 of base portion 11. Molding portion 13 has an outer diameter from approximately 1.0 mm to approximately 3.0 mm. Molding portion 13 has an optical surface 14 and an upper end surface 15 as a lower die surface onto which molten glass droplet 50 is dropped. Upper end surface 15 has a flat shape. Optical surface 14 has a substantially spherical shape and is provided as being recessed in the center of upper end surface 15. The substantially spherical shape herein is not limited to the meaning of a spherical shape but encompasses also the meaning of a non-spherical shape.

A material for lower die 10 is selected in accordance with a condition for pressurization of molten glass droplet 50. A material for lower die 10 is exemplified, for example, by various heat-resistant alloys such as stainless steel, superhard materials mainly composed of tungsten carbide, various types of ceramics such as silicon carbide or silicon nitride, or a composite material containing carbon.

Lower die 10 is arranged on a guide 60. Lower die 10 is driven by not-shown drive means and can carry out reciprocating motion in a direction shown with an arrow AR1 along guide 60 between a position of dropping P1 at which molten glass droplet 50 is received and a position of pressurization P2 at which pressurization and molding is carried out as opposed to upper die 30.

Optical surface 14 and upper end surface 15 are heated to a prescribed temperature by not-shown heating means. As the heating means, for example, a cartridge heater used as being embedded in lower die 10, a sheet-shaped heater used as being in contact with the outside of lower die 10, an infrared heating apparatus for heating optical surface 14 and upper end surface 15 without being in contact with optical surface 14 and upper end surface 15, or a high-frequency induction heating apparatus for heating optical surface 14 and upper end surface 15 by providing a high frequency to lower die 10 is employed.

Outer Frame 20

Outer frame 20 has a cylindrical shape. Outer frame 20 has a height from approximately 3.0 mm to approximately 5.0 mm. Outer frame 20 has an outer diameter from approximately 3.0 mm to approximately 6.0 mm. Outer frame 20 includes a large-diameter portion 21 and a small-diameter portion 24. Large-diameter portion 21 and small-diameter portion 24 are provided continuously. Large-diameter portion 21 is desirably provided in outer frame 20 as necessary. In a case that large-diameter portion 21 is not provided in outer frame 20, outer frame 20 is made of a tubular member having an inner diameter corresponding to small-diameter portion 24.

Small-diameter portion 24 is located on a side of lower die 10 and large-diameter portion 21 is provided above small-diameter portion 24. Large-diameter portion 21 has a height, for example, of 2.5 mm. Small-diameter portion 24 has a height, for example, of 1.5 mm. On an inner side of large-diameter portion 21, an inner circumferential surface 22 is formed. On an inner side of small-diameter portion 24, an inner circumferential surface 25 is formed. Inner circumferential surface 22 and inner circumferential surface 25 are both annularly formed.

Inner circumferential surface 22 of large-diameter portion 21 is greater in inner diameter than inner circumferential surface 25 of small-diameter portion 24. A connection surface 23 is provided between inner circumferential surface 22 and inner circumferential surface 25. The inner diameter of inner circumferential surface 25 is slightly greater than the outer diameter of molding portion 13 of lower die 10. When molten glass droplet 50 is dropped, molding portion 13 of lower die 10 has been arranged on the inner side of inner circumferential surface 25 of outer frame 20.

A material for outer frame 20 is selected in accordance with a condition for pressurization of molten glass droplet 50. A material for outer frame 20 is exemplified, for example, by austenite-based stainless steel or ferrite-based stainless steel. A material for outer frame 20 and a material for lower die 10 may be the same or different.

Upper Die 30

Upper die 30 is arranged above position of pressurization P2. Upper die 30 includes a base portion 31 and a molding portion 33. Molding portion 33 has a columnar shape and protrudes downward from a lower surface 32 of base portion 31. Molding portion 33 has an outer shape from approximately 1.5 mm to approximately 4.0 mm. Molding portion 33 has an optical surface 34 and a lower end surface 35 as an upper die surface. Lower end surface 35 has a flat shape. Optical surface 34 has a substantially spherical shape and is provided as being recessed in the center of lower end surface 35. The substantially spherical shape herein is not limited to the meaning of a spherical shape but encompasses also the meaning of a non-spherical shape.

A material for upper die 30 is selected in accordance with a condition for pressurization of molten glass droplet 50. Materials for upper die 30, lower die 10, and outer frame 20 may be the same or different.

Upper die 30 is driven by not-shown drive means and can carry out reciprocating motion in a direction of pressurization of molten glass droplet 50 and a direction opposite thereto (see an arrow AR2). In this connection, apparatus 100 for manufacturing a glass molded product may be structured such that only upper die 30 moves along a direction shown with arrow AR2, may be structured such that only lower die 10 moves along the direction shown with arrow AR2, or may be structured such that both of lower die 10 and upper die 30 move along the direction shown with arrow AR2. As means for driving lower die 10 and/or upper die 30, desirably, an air cylinder, a hydraulic cylinder, or an electrically powered cylinder including a servo motor is employed.

Optical surface 34 and lower end surface 35 are also heated to a prescribed temperature by not-shown heating means. The heating means may be the same as or different from the heating means used for lower die 10. The heating means for heating lower die 10 and upper die 30 is desirably able to control a temperature of lower die 10 and a temperature of upper die 30 independently of each other.

Dropping Apparatus 40

Dropping apparatus 40 is arranged above position of dropping P1. Dropping apparatus 40 includes a melt bath 44 storing molten glass 42 and a dropping nozzle 46 provided as being suspended from melt bath 44. A type of glass used as molten glass 42 is exemplified, for example, by borosilicate glass, silicate glass, phosphate glass, or lanthanum-based glass.

Dropping nozzle 46 is heated by not-shown heating means. Molten glass 42 can be dropped as molten glass droplet 50 from a tip end of dropping nozzle 46 (see an arrow AR3).

Method of Manufacturing Glass Molded Product

First Step

In manufacturing a glass molded product, initially, outer frame 20 is arranged on upper surface 12 of lower die 10. Molding portion 13 of lower die 10 is inserted on the inner side of small-diameter portion 24 of outer frame 20. A portion of inner circumferential surface 25 close to connection surface 23 is exposed. Not-shown heating means heats lower die 10 and upper die 30. Receiving heat from lower die 10, outer frame 20 is heated. Outer frame 20 is heated until a temperature of outer frame 20 reaches a prescribed value.

Since each temperature of lower die 10, outer frame 20, and upper die 30 is controlled to a proper value, production of wrinkles in a glass molded product manufactured from molten glass droplet 50 or lowering in shape accuracy of a transfer surface is suppressed, and a good transfer surface (an optical surface) can be formed on the glass molded product. Since each temperature of lower die 10, outer frame 20, and upper die 30 is controlled to a proper value, fusion of lower die 10, outer frame 20, and upper die 30 to the glass molded product or shorter service life of each of lower die 10, outer frame 20, and upper die 30 can also be suppressed.

With a glass transition temperature of molten glass droplet 50 being denoted as Tg, each temperature of lower die 10, outer frame 20, and upper die 30 is desirably set, for example, to a temperature within a range from Tg−100° C. to Tg+100 C. An optimal temperature of each of lower die 10, outer frame 20, and upper die 30 is different depending on various conditions such as a type of glass of molten glass droplet 50, a shape and a size of a glass molded product manufactured from molten glass droplet 50, and a material, a shape, and a size of lower die 10, outer frame 20, and upper die 30. An optimal value for each temperature of lower die 10, outer frame 20, and upper die 30 is desirably calculated in advance through experiments. Temperatures of lower die 10, outer frame 20, and upper die 30 may be the same or different.

After each temperature of lower die 10, outer frame 20, and upper die 30 is adjusted to a proper value, molten glass droplet 50 is dropped from dropping apparatus 40 toward lower die 10. Specifically, as dropping nozzle 46 is heated, molten glass 42 which has been stored in melt bath 44 reaches the tip end of dropping nozzle 46. Molten glass 42 forms a liquid pool at the tip end of dropping nozzle 46 owing to an action of surface tension. As dropping nozzle 46 continues to be heated, molten glass 42 is further supplied to the tip end of dropping nozzle 46 and a weight of molten glass 42 at the tip end of dropping nozzle 46 increases.

After the weight of molten glass 42 at the tip end of dropping nozzle 46 reaches a certain value, molten glass 42 leaves the tip end of dropping nozzle 46. Molten glass 42 falls downward from above as molten glass droplet 50 weighing, for example, from approximately 0.1 g to approximately 2.0 g (see arrow AR3). A weight of molten glass droplet 50 dropped from dropping nozzle 46 can be regulated to a desired value by increasing or decreasing an outer diameter of the tip end of dropping nozzle 46. Small holes having a diameter from 1 mm to 4 mm may be provided in a plate-shaped member and molten glass droplet 50 may be caused to pass through the small holes. In this case, small molten glass droplet 50 weighing from 1 mg to 200 mg can be obtained.

Second Step

Figure 2:
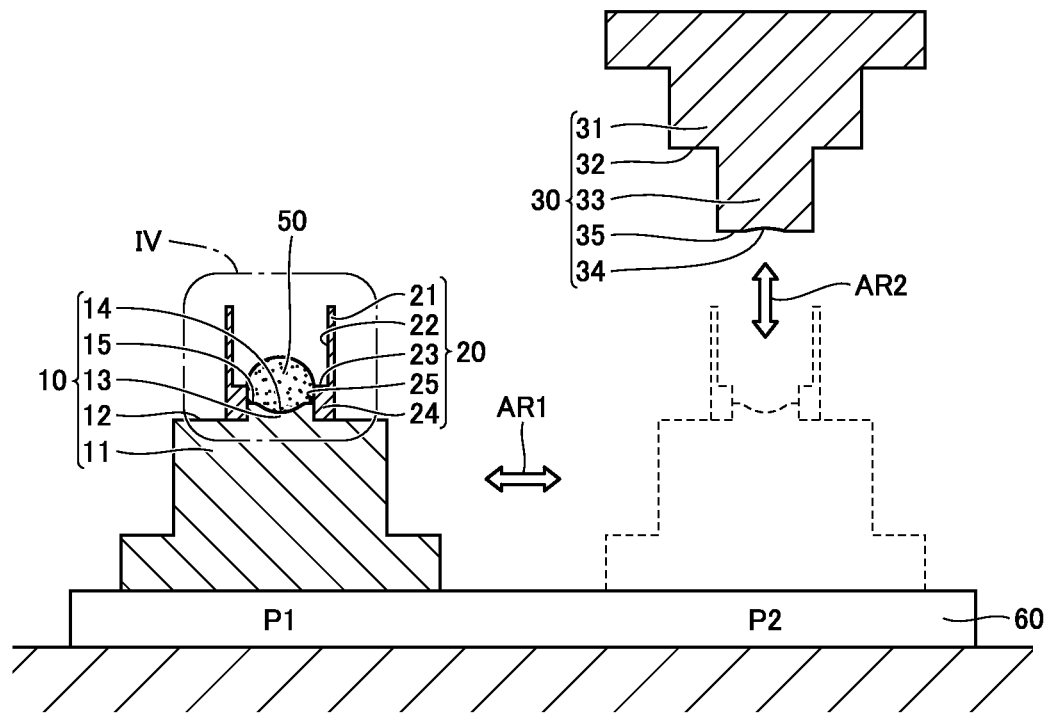
FIG. 2 is a cross-sectional view showing a second step of the method of manufacturing a glass molded product in the comparative example.

Referring to FIG. 2, molten glass droplet 50 having a prescribed weight comes in contact with optical surface 14 of lower die 10. Molten glass droplet 50 wet-spreads over optical surface 14 radially outward and successively comes in contact with upper end surface 15 of lower die 10 and inner circumferential surface 25 of outer frame 20. In contrast, molten glass droplet 50 which wet-spreads over optical surface 14 may also reach upper end surface 15 of lower die 10 after a surface of molten glass droplet 50 comes in contact with inner circumferential surface 25 of outer frame 20.

An upper surface of molten glass droplet 50 forms a substantially spherical shape owing to an action of surface tension. Molten glass droplet 50 is deprived of heat by lower die 10 and outer frame 20 and a temperature of molten glass droplet 50 rapidly lowers.

Third Step

Referring to FIG. 3, lower die 10 which has received molten glass droplet 50 moves from position of dropping P1 to position of pressurization P2 (see an arrow AR4). Upper die 30 moves downward for pressurization of molten glass droplet 50 (see an arrow AR5). Molding portion 33 of upper die 30 is inserted on the inner side of large-diameter portion 21 of outer frame 20. Optical surface 34 and lower end surface 35 of upper die 30 come in contact with molten glass droplet 50. Molten glass droplet 50 is deprived of heat by lower die 10, outer frame 20, and upper die 30 and a temperature of molten glass droplet 50 further lowers.

Upper die 30 pressurizes molten glass droplet 50 at a prescribed load. Molten glass droplet 50 is pressurized and molded by optical surface 14 of lower die 10, optical surface 34 of upper die 30, and inner circumferential surface 25 of outer frame 20. A time period from dropping until start of pressurization is, for example, from approximately 3 seconds to approximately 4 seconds. Magnitude of a load for pressurization of molten glass droplet 50 is set in accordance with a size of a glass molded product to be manufactured from molten glass droplet 50. A load for pressurization of molten glass droplet 50 may be set to a constant value or may be increased and decreased during pressurization.

After the temperature of molten glass droplet 50 lowers and reaches a prescribed value, upper die 30 moves upward. Upper die 30 stops pressurization against molten glass droplet 50. A time period from start of pressurization until stop of pressurization is, for example, from approximately 2 seconds to approximately 3 seconds. Upper die 30 desirably starts to move upward, for example, when a temperature of molten glass droplet 50 reaches a temperature around glass transition temperature Tg. The timing for upper die 30 to start moving upward is optimized depending on a type of glass of molten glass droplet 50, and a shape, a size, and necessary shape accuracy of the glass molded product manufactured from molten glass droplet 50.

After upper die 30 has moved upward, the glass molded product obtained from molten glass droplet 50 is collected by using not-shown suction means. Outer frame 20 may be removed from the glass molded product as necessary or may be employed as a part of a component, together with the glass molded product as necessary. In a case that the method of manufacturing a glass molded product is continuously performed, molten glass droplet 50 is again supplied onto lower die 10 which has moved to position of dropping P1 and the steps the same as above are repeated. The method of manufacturing a glass molded product in the comparative example is configured as above.

Details of Molten Glass Droplet 50 after Dropping

Figure 4:
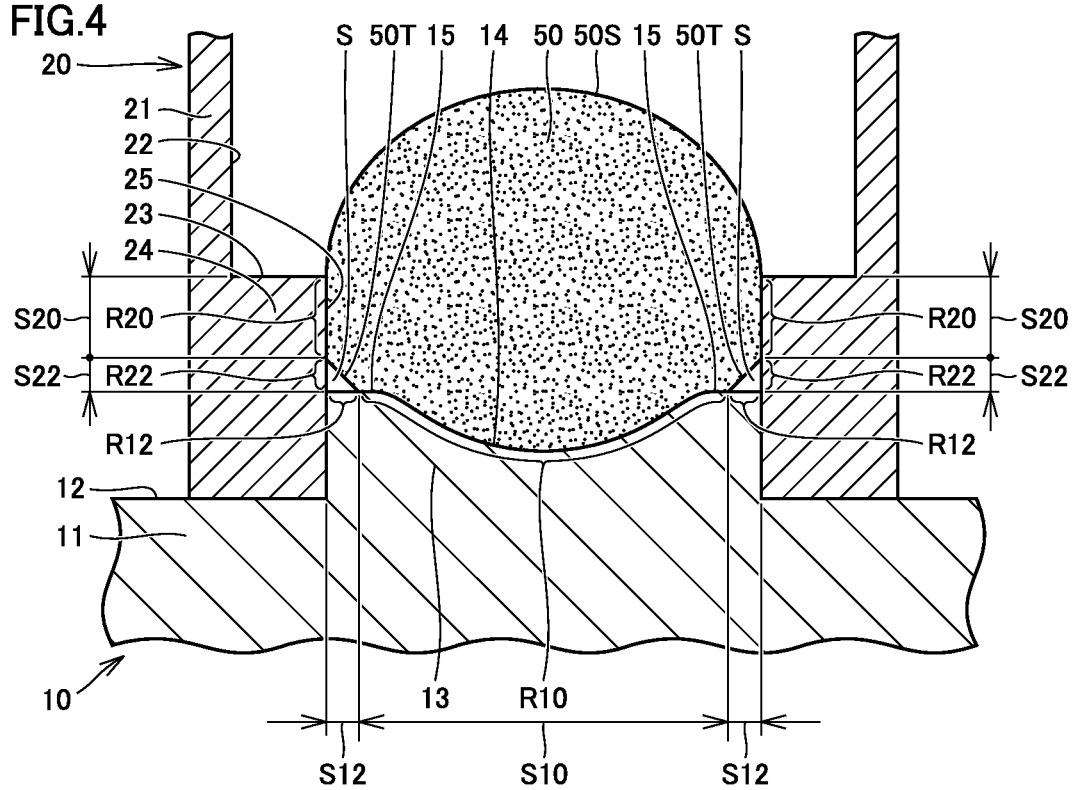
FIG. 4 is a cross-sectional view showing in an enlarged manner, a region surrounded by the line IV in FIG. 2.

FIG. 4 is a cross-sectional view showing in an enlarged manner, a region surrounded by the line IV in FIG. 2. As described above with reference to FIG. 2, molten glass droplet 50 dropped from dropping nozzle 46 (see FIG. 2) comes in contact with optical surface 14 of lower die 10. Molten glass droplet 50 wet-spreads over optical surface 14 radially outward and comes in contact with upper end surface 15 of lower die 10 and inner circumferential surface 25 of outer frame 20. An upper surface 50S of molten glass droplet 50 forms a substantially spherical shape owing to an action of surface tension.

Here, a small gap S is formed around a lower side of molten glass droplet 50. At an interface between gap S and molten glass droplet 50, a tapered surface 50T is formed owing to an action of surface tension of molten glass droplet 50. Gap S is a space surrounded by upper end surface 15 of lower die 10, inner circumferential surface 25 of outer frame 20, and tapered surface 50T of molten glass droplet 50.

Likeliness of production of gap S is different depending on an angle of inclination and a shape of upper end surface 15 of lower die 10 and an angle of inclination and a shape of inner circumferential surface 25 of outer frame 20. Gap S is formed as necessary for the purpose of suppression of occurrence of chipping (see Japanese Laid-Open Patent Publication No. 2008-037703 (PTD 1)). The gap is created as a result of confinement by wet-spread molten glass droplet 50, of air which has been present in a space formed on the inner side of upper end surface 15 of lower die 10 and inner circumferential surface 25 of outer frame 20.

With formation of gap S, a contact region R10 and a non-contact region R12 are formed between molten glass droplet 50 and lower die 10. Contact region R10 has an area S10. In contact region R10, molten glass droplet 50 and lower die 10 are in contact with each other. Non-contact region R12 has an area S12. In non-contact region R12, molten glass droplet 50 and lower die 10 are not in contact with each other (are spaced away from each other).

A contact region R20 and a non-contact region R22 are formed between molten glass droplet 50 and outer frame 20. Contact region R20 has an area S20. In contact region R20, molten glass droplet 50 and outer frame 20 are in contact with each other. Non-contact region R22 has an area S22. In non-contact region R22, molten glass droplet 50 and outer frame 20 are not in contact with each other (are spaced apart from each other).

Increase or Decrease in Weight of Drop

Figure 5:
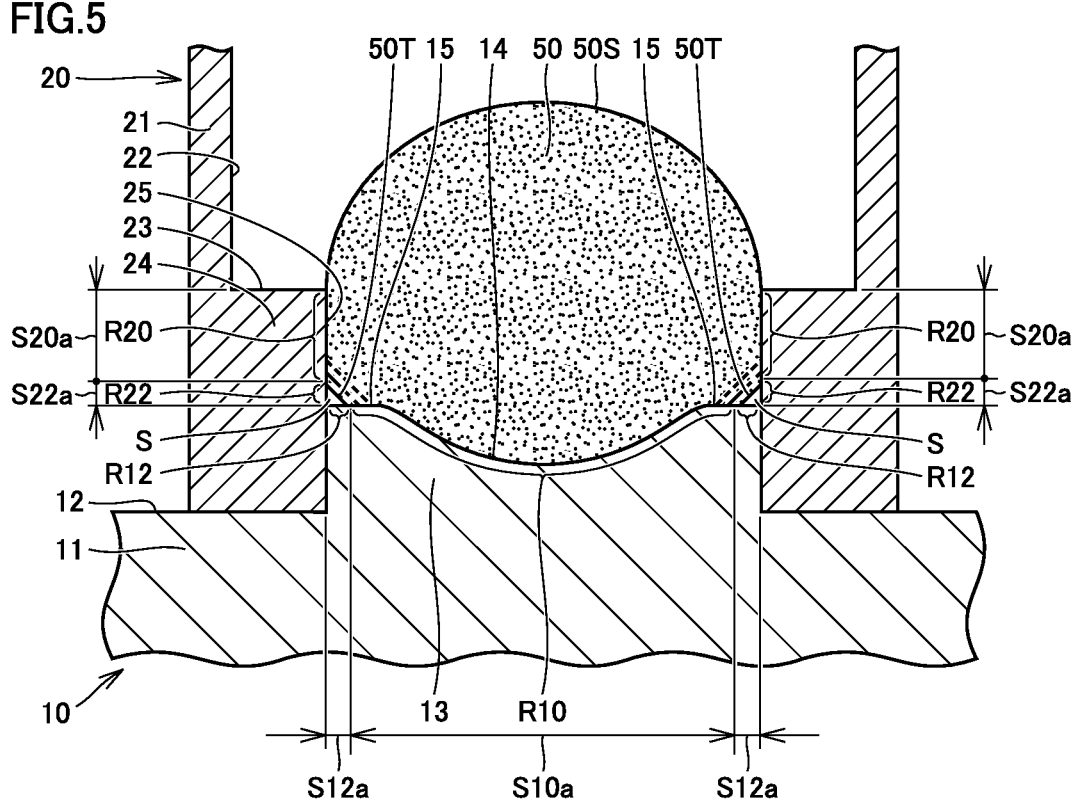
FIG. 5 is a cross-sectional view showing supply of a molten glass droplet greater in weight than a molten glass droplet shown in FIG. 4 onto a lower die in the comparative example.

Referring to FIG. 5, it is difficult to set a weight of molten glass droplet 50 dropped from dropping nozzle 46 (see FIG. 2) each time of pressurization and molding to exactly the same value for each time of dropping. FIG. 5 is a cross-sectional view showing supply of molten glass droplet 50 greater in weight than molten glass droplet 50 shown in FIG. 4 onto lower die 10.

As a weight of dropped molten glass droplet 50 increases, gap S tends to be small. A position of tapered surface 50T also varies downward and outward. A chain dotted line shown in FIG. 5 corresponds to the position in FIG. 4 where tapered surface 50T is formed.

As a weight of dropped molten glass droplet 50 increases, contact region R10 between molten glass droplet 50 and lower die 10 has an area S10a. Area S10a is greater than area S10 in FIG. 4. Non-contact region R12 between molten glass droplet 50 and lower die 10 has an area S12a. Area S12a is smaller than area S12 in FIG. 4.

As a weight of dropped molten glass droplet 50 increases, contact region R20 between molten glass droplet 50 and outer frame 20 has an area S20a. Area S20a is greater than area S20 in FIG. 4. Non-contact region R22 between molten glass droplet 50 and outer frame 20 has an area S22a. Area S22a is smaller than area S22 in FIG. 4.

In apparatus 100 for manufacturing a glass molded product (see FIG. 2), as a weight of dropped molten glass droplet 50 increases, an area of contact between molten glass droplet 50 and lower die 10 increases (area S10→area S10a) and an area of contact between molten glass droplet 50 and outer frame 20 also increases (area S20→area S20a).

A dotted line in FIG. 5 shows a position of tapered surface 50T formed at the time when molten glass droplet 50 smaller in weight than molten glass droplet 50 shown in FIG. 4 is supplied onto lower die 10.

As can be read based on the position of tapered surface 50T shown with the dotted line, in apparatus 100 for manufacturing a glass molded product (see FIG. 2), as a weight of dropped molten glass droplet 50 decreases, an area of contact between molten glass droplet 50 and lower die 10 decreases and an area of contact between molten glass droplet 50 and outer frame 20 also decreases.

Therefore, in apparatus 100 for manufacturing a glass molded product (see FIG. 2), as a weight of molten glass droplet 50 dropped from dropping nozzle 46 (see FIG. 2) increases or decreases, not only an area of contact between molten glass droplet 50 and lower die 10 varies but also an area of contact between molten glass droplet 50 and outer frame 20 also varies. As set forth in the beginning, a greater area of contact leads to a higher rate of lowering in a temperature of a molten glass droplet. A smaller area of contact leads to a lower rate of lowering in a temperature of a molten glass droplet.

After lapse of a prescribed period of time since supply of molten glass droplet 50 onto lower die 10, molten glass droplet 50 is pressurized and molded with the use of upper die 30. In general, the timing to start pressurization and molding (timing of pressing) is determined in advance through experiments. When a plurality of times of pressurization and molding are consecutively performed, the timing of pressing is set to a constant value and the timing of pressing is hardly adjusted each time of pressurization and molding.

Viscosity of molten glass droplet 50 varies depending on a temperature of molten glass droplet 50. Viscosity of molten glass droplet 50 at the time of start of pressurization and molding affects performance of a glass molded product obtained by pressurization and molding. In order to suppress generation of individual difference in performance among a plurality of glass molded products obtained as finished products, viscosity of molten glass droplet 50 pressurized at prescribed timing of pressing preferably does not vary each time of a plurality of times of pressurization and molding (in other words, there is no variation in viscosity of molten glass droplet 50 each time of pressurization and molding performed a plurality of times).

In contrast, in apparatus 100 for manufacturing a glass molded product (see FIG. 2), with increase or decrease in weight of dropped molten glass droplet 50, an area of contact between molten glass droplet 50 and lower die 10 and an area of contact between molten glass droplet 50 and outer frame 20 tend to vary, and it is difficult to suppress generation of individual difference in performance among a plurality of glass molded products obtained as finished products.

Variation in Position of Dropping

Figure 6:
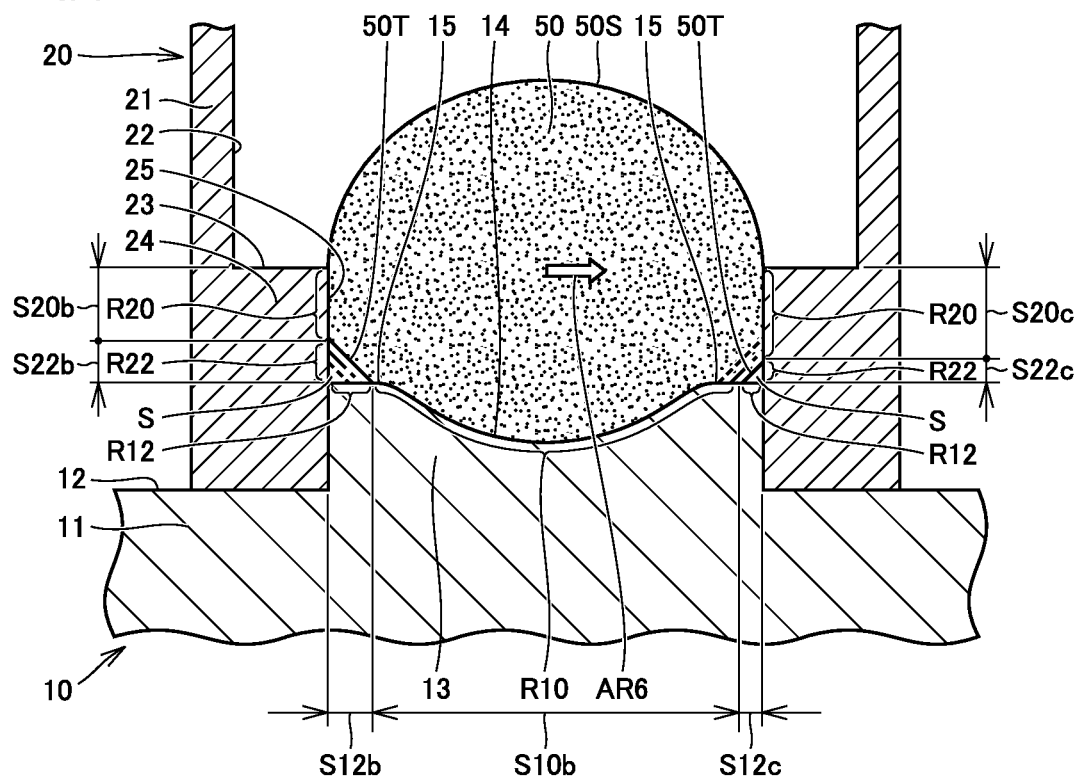
FIG. 6 is a cross-sectional view showing dropping of a molten glass droplet at a position varied to the right of the sheet surface as compared with a position of dropping of the molten glass droplet shown in FIG. 4, in the comparative example.

Referring to FIG. 6, it is difficult to set a position of dropping on lower die 10 of molten glass droplet 50 dropped from dropping nozzle 46 (see FIG. 2) each time of pressurization and molding to exactly the same value for each time of dropping. FIG. 6 is a cross-sectional view showing dropping of molten glass droplet 50 at a position varied to the right of the sheet surface (in a direction shown with an arrow AR6) as compared with the position of dropping of molten glass droplet 50 shown in FIG. 4.

As a position of dropping of molten glass droplet 50 varies in the direction shown with arrow AR6, gap S is formed in an unbalanced shape. A size of gap S on the left of the sheet surface is greater and a size of gap S on the right of the sheet surface is smaller. A position of tapered surface 50T also varies in the direction shown with arrow AR6. A chain dotted line shown in FIG. 6 corresponds to the position in FIG. 4 where tapered surface 50T is formed.

When a position of dropping of molten glass droplet 50 varies in the direction shown with arrow AR6, contact region R10 between molten glass droplet 50 and lower die 10 has an area S10b. Area S10b may be greater or smaller than area S10 in FIG. 4. Non-contact region R12 between molten glass droplet 50 and lower die 10 has area S12b (width) on the left of the sheet surface and has an area S12c (width) on the right of the sheet surface. Area S12b is greater than area S12 in FIG. 4 (a portion on the left of the sheet surface). Area S12c is smaller than area S12 in FIG. 4 (a portion on the right of the sheet surface).

As a position of dropping of molten glass droplet 50 varies in the direction shown with arrow AR6, contact region R20 between molten glass droplet 50 and outer frame 20 has an area S20b on the left of the sheet surface and an area S20c on the right of the sheet surface. Area S20b is smaller than area S20 in FIG. 4 (a portion on the left of the sheet surface). Area S20c is greater than area S20 in FIG. 4 (a portion on the right of the sheet surface). Non-contact region R22 between molten glass droplet 50 and outer frame 20 has an area S22b on the left of the sheet surface and has an area S22c on the right of the sheet surface. Area S22b is greater than area S22 in FIG. 4 (a portion on the left of the sheet surface). Area S22c is smaller than area S22 in FIG. 4 (a portion on the right of the sheet surface).

In apparatus 100 for manufacturing a glass molded product (see FIG. 2), as a position of dropping on lower die 10 of molten glass droplet 50 varies in the direction shown with arrow AR6, a portion of molten glass droplet 50 on the right of the sheet surface comes in contact with lower die 10 and outer frame 20 to a relatively greater extent, and a portion thereof on the left of the sheet surface comes in contact with lower die 10 and outer frame 20 to a relatively lesser extent.

A dotted line in FIG. 6 shows a position of tapered surface 50T formed at the time when molten glass droplet 50 is dropped at a position varied to the left of the sheet surface (in a direction opposite to arrow AR6) as compared with the position of dropping of molten glass droplet 50 shown in FIG. 4.

As can be read based on the position of tapered surface 50T shown with the dotted line, in apparatus 100 for manufacturing a glass molded product (see FIG. 2), as a position of dropping on lower die 10 of dropped molten glass droplet 50 varies in the direction opposite to arrow AR6, a portion of molten glass droplet 50 on the right of the sheet surface comes in contact with lower die 10 and outer frame 20 to a relatively lesser extent, and a portion thereof on the left of the sheet surface comes in contact with lower die 10 and outer frame 20 to a relatively greater extent.

Therefore, in apparatus 100 for manufacturing a glass molded product (see FIG. 2), as a position of dropping on lower die 10 of molten glass droplet 50 varies, not only an area of contact between molten glass droplet 50 and lower die 10 varies but also an area of contact between molten glass droplet 50 and outer frame 20 also varies. As set forth in the beginning, a greater area of contact leads to a higher rate of lowering in a temperature of a molten glass droplet. A smaller area of contact leads to a lower rate of lowering in a temperature of a molten glass droplet.

After lapse of a prescribed period of time since supply of molten glass droplet 50 onto lower die 10, molten glass droplet 50 is pressurized and molded with the use of upper die 30. In general, the timing to start pressurization and molding (timing of pressing) is determined in advance through experiments. When a plurality of times of pressurization and molding are consecutively performed, the timing of pressing is set to a constant value and the timing of pressing is hardly adjusted each time of pressurization and molding.

Viscosity of molten glass droplet 50 varies depending on a temperature of molten glass droplet 50. Viscosity of molten glass droplet 50 at the time of start of pressurization and molding affects performance of a glass molded product obtained by pressurization and molding. In order to suppress generation of individual difference in performance among a plurality of glass molded products obtained as finished products, viscosity of molten glass droplet 50 pressurized at prescribed timing of pressing preferably does not vary each time of a plurality of times of pressurization and molding (in other words, there is no variation in viscosity of molten glass droplet 50 each time of pressurization and molding performed a plurality of times).

In contrast, in apparatus 100 for manufacturing a glass molded product (see FIG. 2), with variation in a position of dropping on lower die 10 of molten glass droplet 50, an area of contact between molten glass droplet 50 and lower die 10 and an area of contact between molten glass droplet 50 and outer frame 20 tend to vary, and it is difficult to suppress generation of individual difference in performance among a plurality of glass molded products obtained as finished products.

Embodiments

Each embodiment based on the present invention will be described hereinafter with reference to the drawings. When the number, a quantity or the like is mentioned in the description of each embodiment, the scope of the present invention is not necessarily limited to the number, the quantity or the like, unless otherwise specified. In the description of each embodiment, elements the same as or corresponding to those in the comparative example above have the same reference characters allotted and redundant description may not be repeated.

First Embodiment

Apparatus 200 for Manufacturing Glass Molded Product

Figure 7:
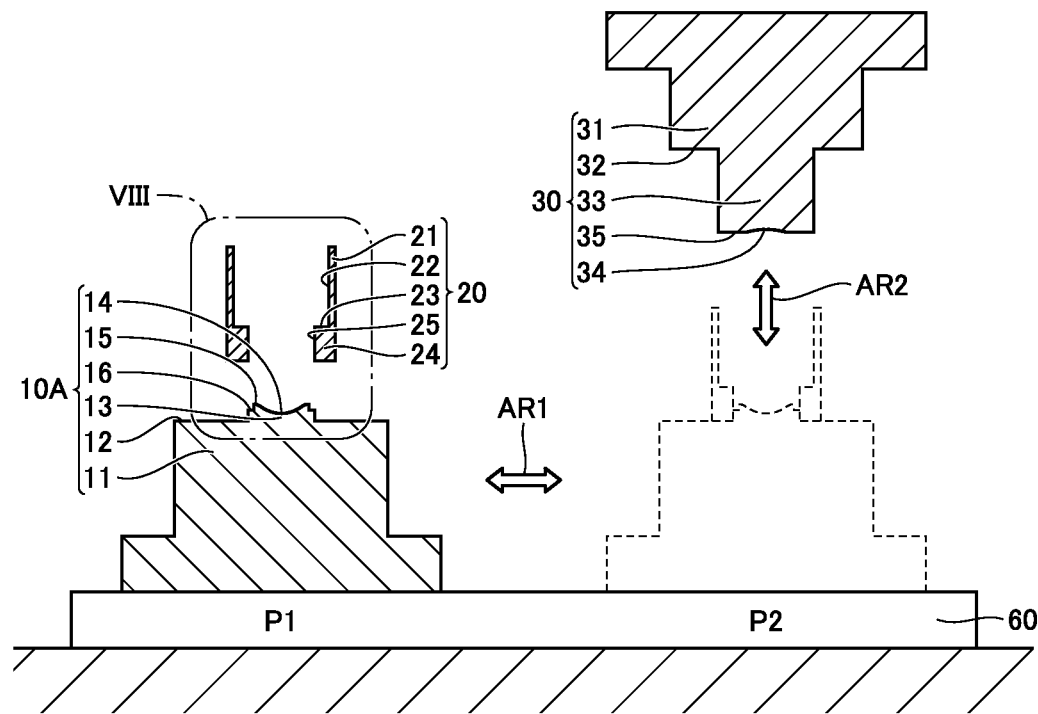
FIG. 7 is a cross-sectional view showing an apparatus for manufacturing a glass molded product used in the method of manufacturing a glass molded product in a first embodiment.

Referring to FIG. 7, in the method of manufacturing a glass molded product in the present embodiment, an apparatus 200 for manufacturing a glass molded product is prepared and used. Apparatus 200 for manufacturing a glass molded product includes a lower die 10A, outer frame 20, upper die 30, and dropping apparatus 40. Lower die 10A and outer frame 20 can function as a lower die for molding glass.

Lower die 10A, outer frame 20, and upper die 30 in the present embodiment have a shape in rotation symmetry with respect to each central axis. Though details will be described later, apparatus 200 for manufacturing a glass molded product obtains a glass molded product by pressurizing and molding molten glass droplet 50 dropped from dropping apparatus 40 toward lower die 10A, with the use of lower die 10A, outer frame 20, and upper die 30.

Lower Die 10A

Figure 8:
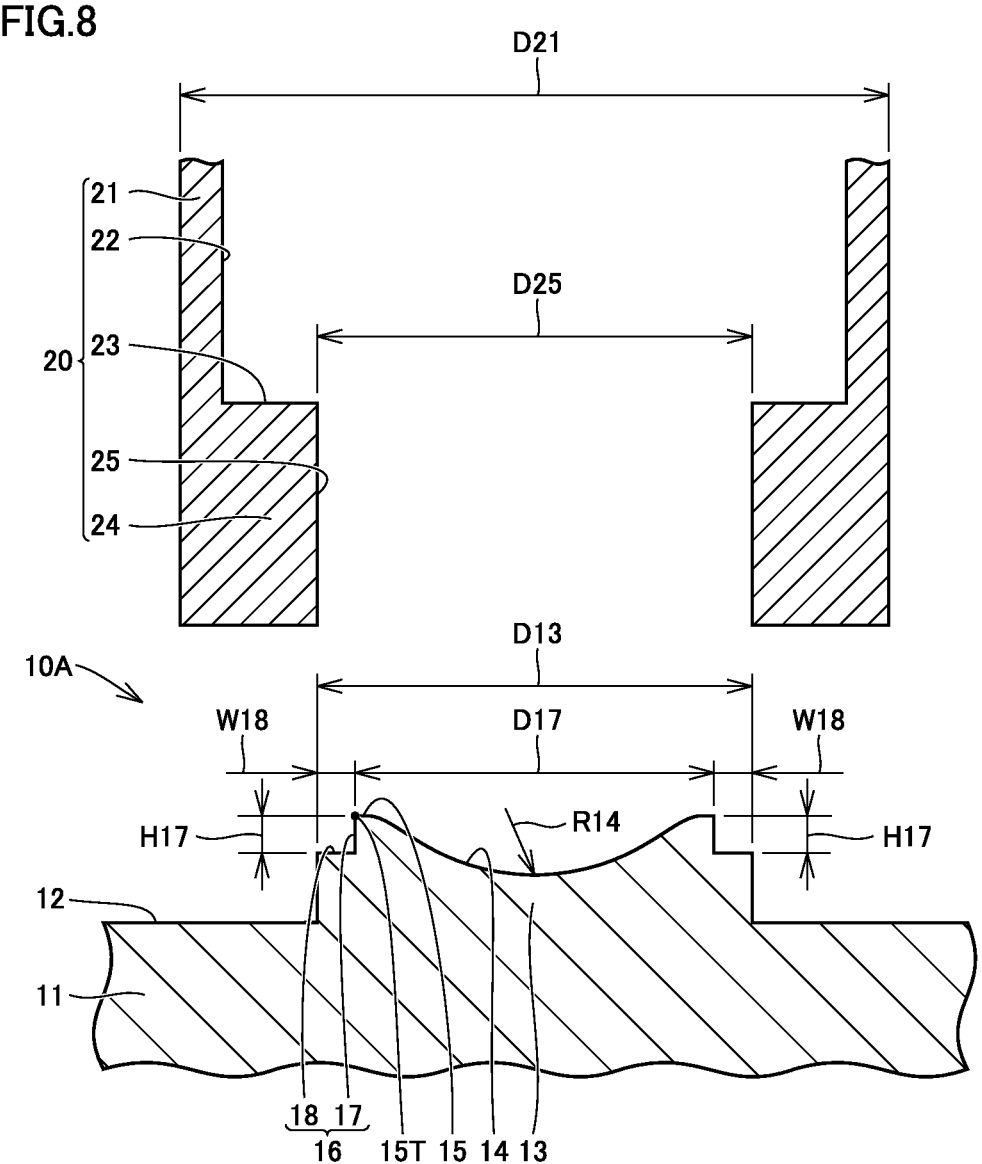
FIG. 8 is a cross-sectional view showing in an enlarged manner, a region surrounded by the line VIII in FIG. 7.
Figure 9:
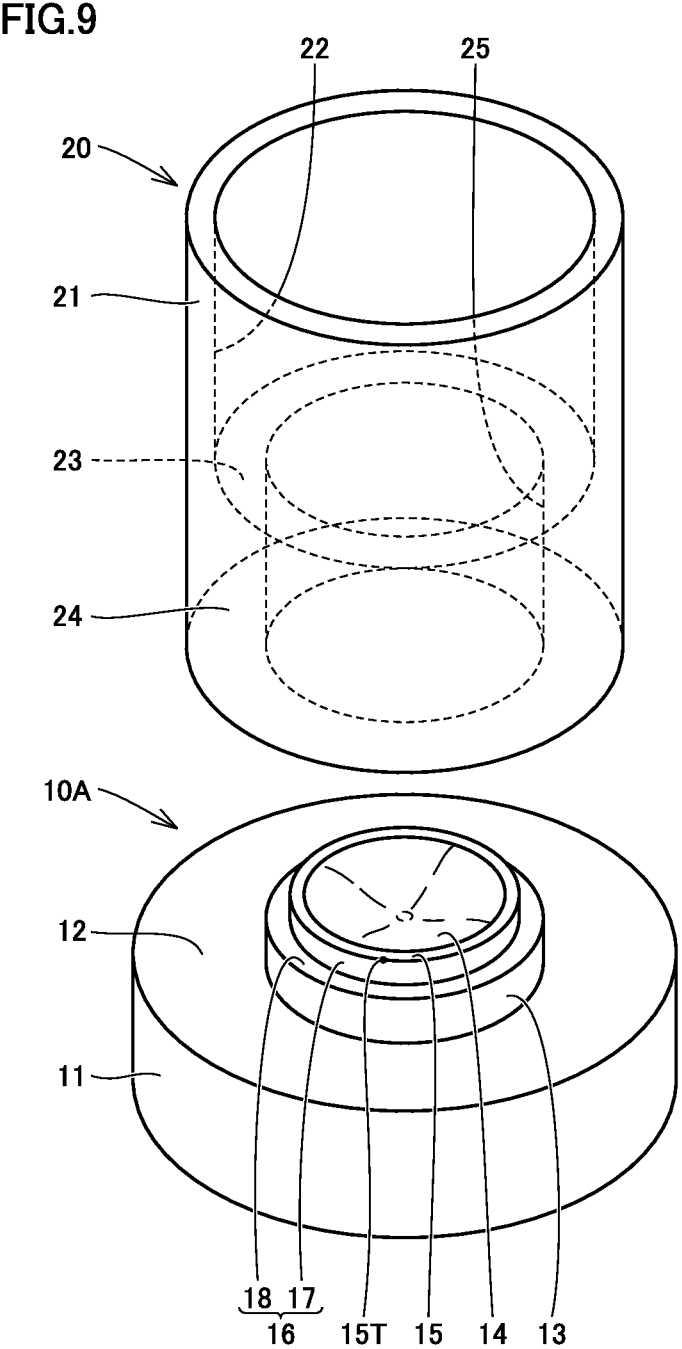
FIG. 9 is a perspective view showing a lower die and the outer frame of the apparatus for manufacturing a glass molded product used in the method of manufacturing a glass molded product in the first embodiment viewed from diagonally above.

FIG. 8 is a cross-sectional view showing in an enlarged manner, a region surrounded by the line VIII in FIG. 7. FIG. 9 is a perspective view showing lower die 10A and outer frame 20 viewed from diagonally above.

Referring to FIGS. 7 to 9, lower die 10A includes base portion 11 and molding portion 13. Molding portion 13 has a columnar shape and protrudes upward from upper surface 12 of base portion 11. Molding portion 13 has an outer diameter from approximately 1.0 mm to approximately 3.0 mm. Molding portion 13 has optical surface 14 and upper end surface 15 as the lower die surface onto which molten glass droplet 50 is dropped. Upper end surface 15 has a flat shape. Optical surface 14 has a substantially spherical shape and is provided as being recessed in the center of upper end surface 15.

Molding portion 13 of lower die 10A in the present embodiment further has a space forming surface 16 (a first space forming surface). Space forming surface 16 includes a standing wall surface 17 extending downward away from an outer edge end portion 15T of upper end surface 15 (see FIGS. 8 and 9) with outer edge end portion 15T being defined as a starting point and an outer surface 18 extending radially outward from a lower end of standing wall surface 17. Standing wall surface 17 and outer surface 18 are located below a height position where outer edge end portion 15T is provided.

Referring to FIG. 8, dimensional relation of lower die 10A is, for example, as follows. Molding portion 13 has an outer diameter D13 of approximately 3.0 mm. Optical surface 14 has a radius of curvature R14 of approximately 1.5 mm. Standing wall surface 17 has a height H17 of approximately 0.3 mm. Standing wall surface 17 has an outer diameter D17 of approximately 2.4 mm. Outer surface 18 has a width W18 of approximately 0.3 mm.

Outer Frame 20

Referring to FIGS. 7 to 9, outer frame 20 in the present embodiment is structured substantially similarly to outer frame 20 in the comparative example described above. Specifically, outer frame 20 has a cylindrical shape. Outer frame 20 has an outer diameter D21 (see FIG. 8) of approximately 5.0 mm. Outer frame 20 includes large-diameter portion 21 and small-diameter portion 24. Large-diameter portion 21 and small-diameter portion 24 are provided continuously.

Small-diameter portion 24 is located on a side of lower die 10A and large-diameter portion 21 is provided above small-diameter portion 24. On the inner side of large-diameter portion 21, inner circumferential surface 22 is formed. On the inner side of small-diameter portion 24, inner circumferential surface 25 is formed. Inner circumferential surface 22 and inner circumferential surface 25 are both annularly formed.

An inner diameter of inner circumferential surface 22 of large-diameter portion 21 is greater than an inner diameter D25 of inner circumferential surface 25 of small-diameter portion 24. Connection surface 23 is provided between inner circumferential surface 22 and inner circumferential surface 25. Inner diameter D25 of inner circumferential surface 25 is slightly greater than outer diameter D13 (approximately 3.0 mm) of molding portion 13 of lower die 10A. When molten glass droplet 50 is dropped, molding portion 13 of lower die 10A has been arranged on the inner side of inner circumferential surface 25 of outer frame 20.

Method of Manufacturing Glass Molded Product

Figure 10:
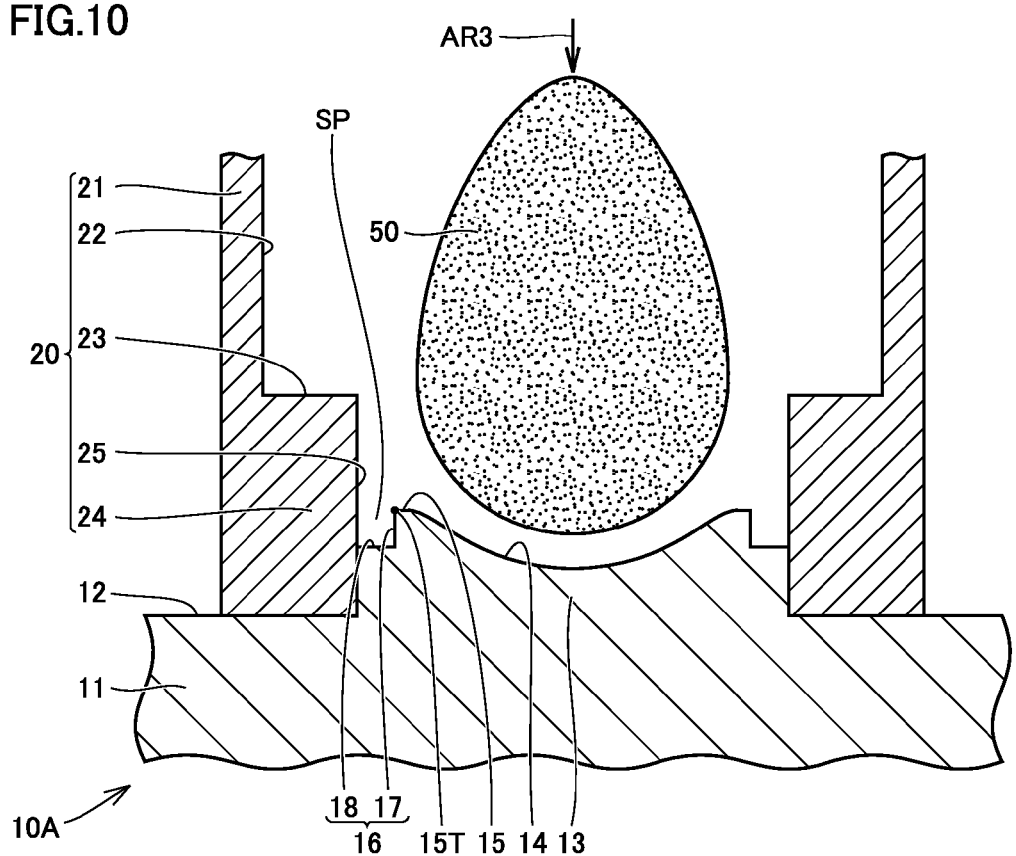
FIG. 10 is a cross-sectional view showing a first step (No. 1) of the method of manufacturing a glass molded product in the first embodiment.

Referring to FIG. 10, in manufacturing a glass molded product, initially, outer frame 20 is arranged on upper surface 12 of lower die 10A. Molding portion 13 of lower die 10A is inserted on the inner side of small-diameter portion 24 of outer frame 20. Outer edge end portion 15T of lower die 10A is located below inner circumferential surface 25 of outer frame 20 and a portion of inner circumferential surface 25 close to connection surface 23 is exposed. A space SP is formed between space forming surface 16 (outer edge end portion 15T of lower die 10A) and inner circumferential surface 25 of outer frame 20.

Not-shown heating means heats lower die 10A and upper die 30 (see FIG. 7). Receiving heat from lower die 10A, outer frame 20 is heated. Outer frame 20 is heated until a temperature of outer frame 20 reaches a prescribed value. Thereafter, molten glass droplet 50 having a prescribed weight from approximately 0.1 g to approximately 2.0 g is dropped downward from above (see arrow AR3).

Figure 11:
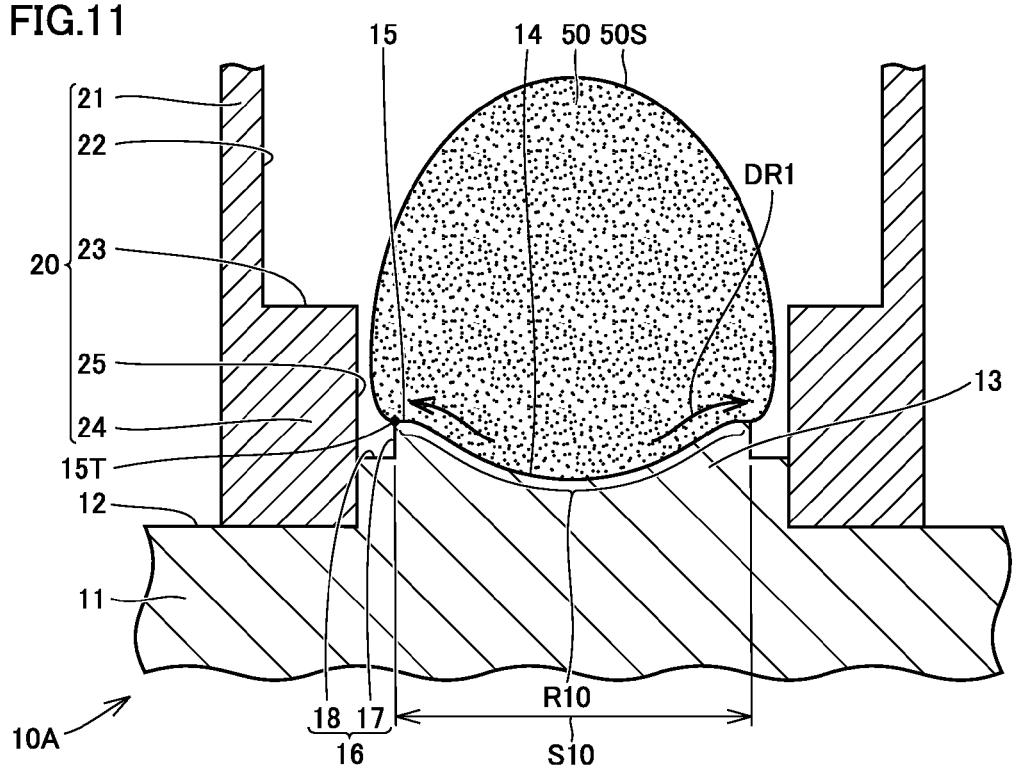
FIG. 11 is a cross-sectional view showing the first step (No. 2) of the method of manufacturing a glass molded product in the first embodiment.

Referring to FIG. 11, molten glass droplet 50 having a prescribed weight comes in contact with optical surface 14 of lower die 10A having a recessed shape. Molten glass droplet 50 wet-spreads over optical surface 14 radially outward (see an arrow DR1) and successively reaches upper end surface 15 of lower die 10A and outer edge end portion 15T of upper end surface 15.

Preferably, a prescribed amount of molten glass droplet 50 is desirably dropped on optical surface 14 such that molten glass droplet 50 wet-spreads to reach the entire circumference of outer edge end portion 15T (in other words, molten glass droplet 50 covers the entire surface of optical surface 14 and upper end surface 15). Since the prescribed amount here is different depending on various conditions such as a type of glass of molten glass droplet 50, a material for lower die 10A, a shape and a size of optical surface 14, and a shape and a size of upper end surface 15, it is desirably calculated in advance through experiments.

Figure 12:
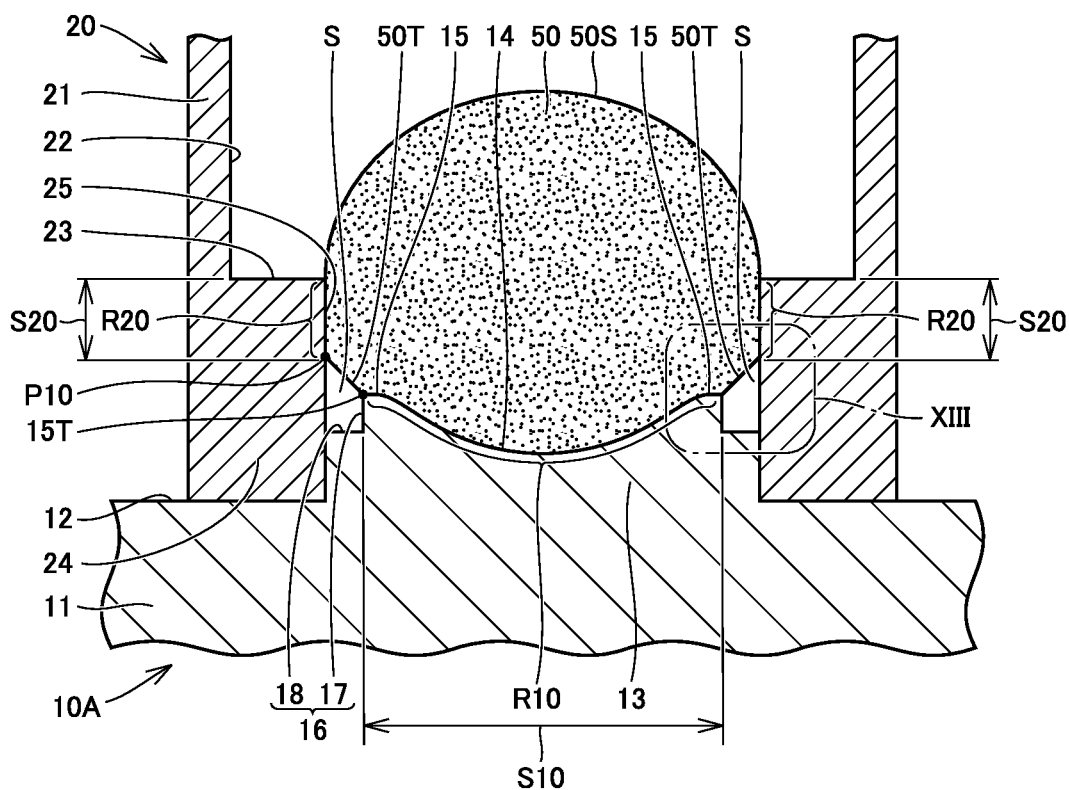
FIG. 12 is a cross-sectional view showing the first step (No. 3) of the method of manufacturing a glass molded product in the first embodiment.

Referring to FIG. 12, after molten glass droplet 50 reaches outer edge end portion 15T, a portion of molten glass droplet 50 above outer edge end portion 15T further spreads radially outward. Here, a portion of molten glass droplet 50 below outer edge end portion 15T does not further spread radially outward of outer edge end portion 15T, owing to an action of surface tension of molten glass droplet 50.

Area S10 of contact between molten glass droplet 50 and lower die 10A shown in FIG. 12 and area S10 of contact between molten glass droplet 50 and lower die 10A shown in FIG. 11 are the same in value. In other words, even when a state of molten glass droplet 50 shown in FIG. 11 makes transition to a state of molten glass droplet 50 shown in FIG. 12, area S10 of contact between molten glass droplet 50 and lower die 10A does not vary.

The portion of molten glass droplet 50 above outer edge end portion 15T further spreads radially outward and comes in contact with inner circumferential surface 25 of outer frame 20. Contact region R10 having area S10 is formed between molten glass droplet 50 and lower die 10A. Contact region R20 having area S20 is formed between molten glass droplet 50 and outer frame 20. Area S10 of contact between molten glass droplet 50 and lower die 10A does not vary from area S10 of contact in FIG. 11. Molten glass droplet 50 is deprived of heat by lower die 10A and outer frame 20, a temperature of molten glass droplet 50 rapidly lowers, and solidification of a portion in the vicinity of a bottom surface of the molten glass droplet proceeds.

Upper surface 50S of molten glass droplet 50 forms a substantially spherical shape owing to an action of surface tension. Gap S is formed around the lower side of molten glass droplet 50 and above space forming surface 16. At the interface between gap S and molten glass droplet 50, tapered surface 50T is formed owing to an action of surface tension of molten glass droplet 50. Gap S is a space surrounded by standing wall surface 17 of lower die 10A, outer surface 18 of lower die 10A, inner circumferential surface 25 of outer frame 20, and tapered surface 50T of molten glass droplet 50.

Tapered surface 50T (a surface of molten glass droplet 50 dropped onto the lower die surface) connects outer edge end portion 15T of lower die 10A and a portion P10 of inner circumferential surface 25 of outer frame 20 which is located above a position of outer edge end portion 15T to each other. A portion of molten glass droplet 50 below outer edge end portion 15T does not further spread radially outward of outer edge end portion 15T owing to an action of surface tension of molten glass droplet 50, and does not wet-spread over space forming surface 16. At the time when glass is pressurized and molded by upper die 30, glass has solidified to some extent and hence glass does not enter gap S.

Figure 13:
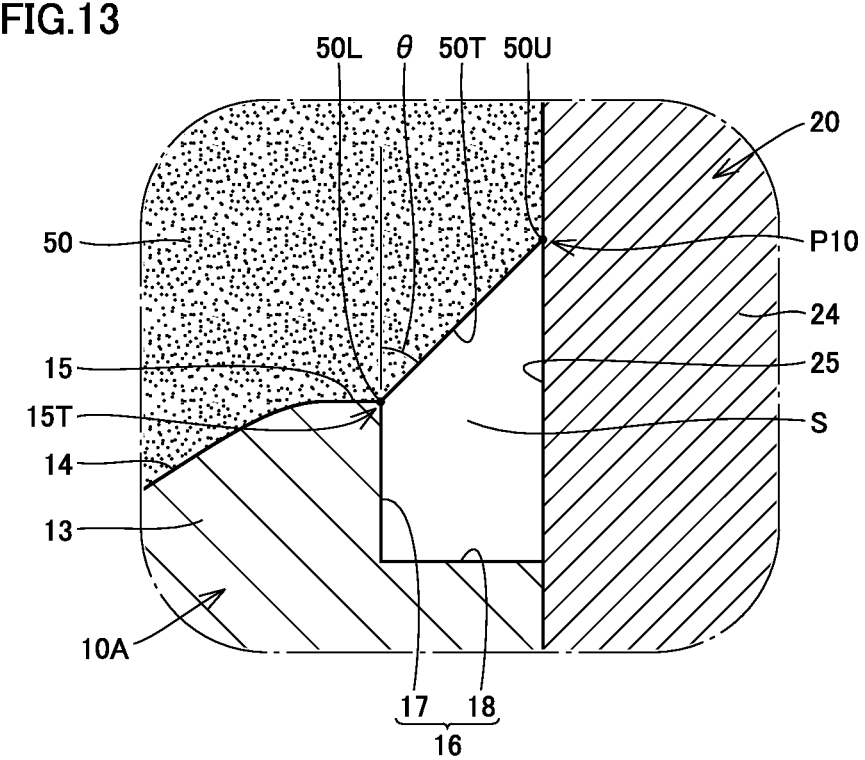
FIG. 13 is a cross-sectional view showing in an enlarged manner, a region surrounded by the line XIII in FIG. 12.

FIG. 13 is a cross-sectional view showing in an enlarged manner, a region surrounded by the line XIII in FIG. 12. Preferably, an angle θ formed with respect to a direction of gravity by a straight line connecting an upper end 50U and a lower end 50L of tapered surface 50T (specifically, tapered surface 50T of molten glass droplet 50 connecting outer edge end portion 15T and portion P10 of inner circumferential surface 25 located above the position of outer edge end portion 15T to each other) to each other is approximately 45→.

As in the comparative example described above (see FIG. 3), lower die 10A which has received molten glass droplet 50 moves from position of dropping P1 (see FIG. 7) to position of pressurization P2 (see FIG. 7). Thereafter, molten glass droplet 50 is pressurized and molded by lower die 10A, outer frame 20, and upper die 30. As described above, at the time when glass is pressurized and molded by upper die 30, glass has solidified to some extent and hence glass does not enter gap S.

After upper die 30 has moved upward, the glass molded product obtained from molten glass droplet 50 is collected by using not-shown suction means. Outer frame 20 may be removed from the glass molded product as necessary or may be employed as a part of a component together with the glass molded product as necessary. In a case that the method of manufacturing a glass molded product is continuously performed, molten glass droplet 50 is again supplied onto lower die 10A which has moved to position of dropping P1 and the steps the same as above are repeated. The method of manufacturing a glass molded product in the present embodiment is configured as above.

Increase or Decrease in Weight of Drop

It is difficult to set a weight of molten glass droplet 50 dropped from dropping nozzle 46 (see FIG. 7) each time of pressurization and molding to exactly the same value for each time of dropping.

Figure 14:
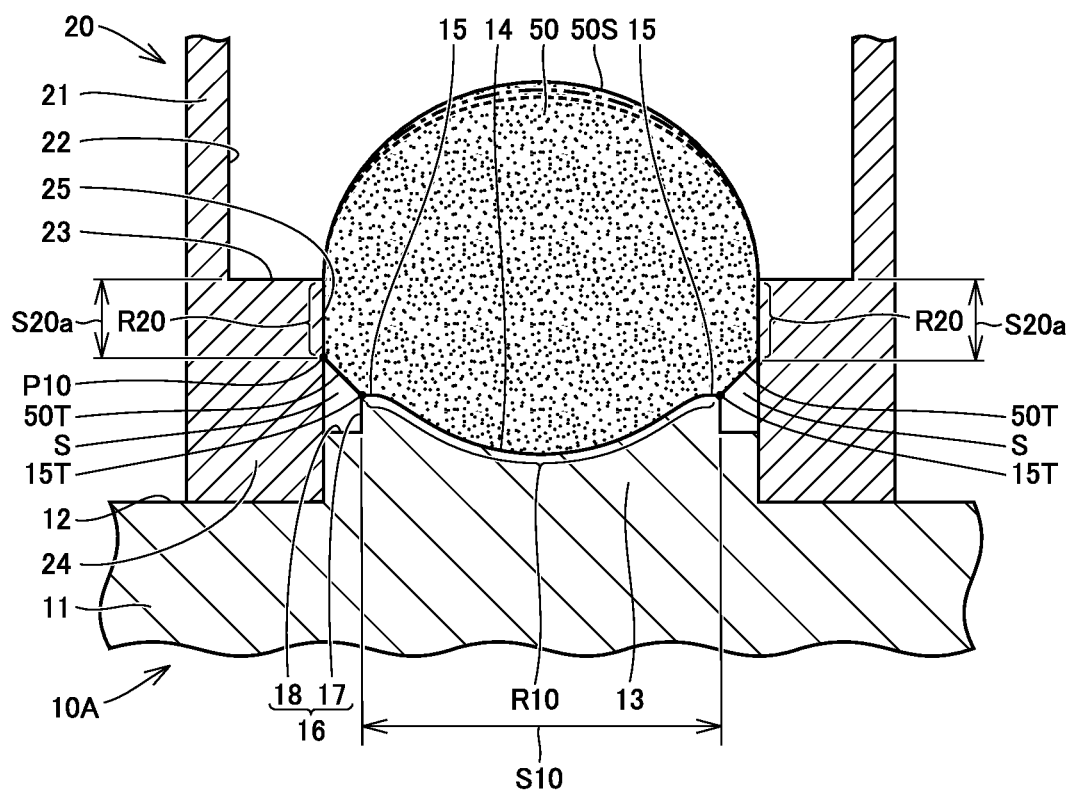
FIG. 14 is a cross-sectional view showing supply of a molten glass droplet greater in weight than a molten glass droplet shown in FIG. 12 onto the lower die in the first embodiment.

FIG. 14 is a cross-sectional view showing supply of molten glass droplet 50 greater in weight than molten glass droplet 50 shown in FIG. 12 onto lower die 10A. A chain dotted line shown in FIG. 14 corresponds to the position in FIG. 12 where upper surface 50S of molten glass droplet 50 is formed. Contact region R20 between molten glass droplet 50 and outer frame 20 has area S20a. Here, unlike the comparative example above, in the present embodiment, even when a weight of dropped molten glass droplet 50 increases, an angle, a shape, and a position of tapered surface 50T hardly vary. Only a position of upper surface 50S of molten glass droplet 50 varies, and area S20a of contact region R20 between molten glass droplet 50 and outer frame 20 is substantially the same in value as area S20 in FIG. 12.

Furthermore, unlike the comparative example above, in the present embodiment, even when a weight of dropped molten glass droplet 50 increases, contact region R10 between molten glass droplet 50 and lower die 10A has area S10. Area S10 is the same in value as area S10 in FIG. 12. In other words, even when a weight of dropped molten glass droplet 50 increases, an area of contact between molten glass droplet 50 and lower die 10A does not vary.

In apparatus 200 for manufacturing a glass molded product (see FIG. 7), even when a weight of dropped molten glass droplet 50 increases, an area of contact between molten glass droplet 50 and lower die 10A does not vary (area S10→area S10) and an area of contact between molten glass droplet 50 and outer frame 20 also hardly varies (area S20→area S20a).

A dotted line in FIG. 14 shows a position of upper surface 50S of molten glass droplet 50 formed at the time when molten glass droplet 50 smaller in weight than molten glass droplet 50 shown in FIG. 12 is supplied onto lower die 10A.

In apparatus 200 for manufacturing a glass molded product (see FIG. 7), even when a weight of dropped molten glass droplet 50 decreases, an angle, a shape, and a position of tapered surface 50T hardly vary. Only a position of upper surface 50S of molten glass droplet 50 varies, an area of contact between molten glass droplet 50 and lower die 10A does not vary, and an area of contact between molten glass droplet 50 and outer frame 20 also hardly varies.

Therefore, in apparatus 200 for manufacturing a glass molded product (see FIG. 7), even when a weight of dropped molten glass droplet 50 dropped from dropping nozzle 46 (see FIG. 7) increases or decreases, an area of contact between molten glass droplet 50 and lower die 10A does not vary and in addition an area of contact between molten glass droplet 50 and outer frame 20 also hardly varies. In the comparative example described above, when a weight of dropped molten glass droplet 50 increases or decreases, not only an area of contact between molten glass droplet 50 and lower die 10 varies but also an area of contact between molten glass droplet 50 and outer frame 20 also varies.

In apparatus 200 for manufacturing a glass molded product, even when a weight of dropped molten glass droplet 50 increases or decreases, an area of contact between molten glass droplet 50 and lower die 10A is less likely to vary and an area of contact between molten glass droplet 50 and outer frame 20 is also less likely to vary. A quantity of heat of molten glass droplet 50 removed by lower die 10A and outer frame 20 hardly changes. According to the method of manufacturing a glass molded product with the use of apparatus 200 for manufacturing a glass molded product, even when a weight of drop increases or decreases, as compared with the method of manufacturing a glass molded product with the use of apparatus 100 for manufacturing a glass molded product, generation of individual difference in performance among a plurality of glass molded products obtained as finished products can be suppressed.

Variation in Position of Dropping

It is difficult to set a position of dropping on lower die 10A of molten glass droplet 50 dropped from dropping nozzle 46 (see FIG. 7) each time of pressurization and molding to exactly the same value for each time of dropping.

Figure 15:
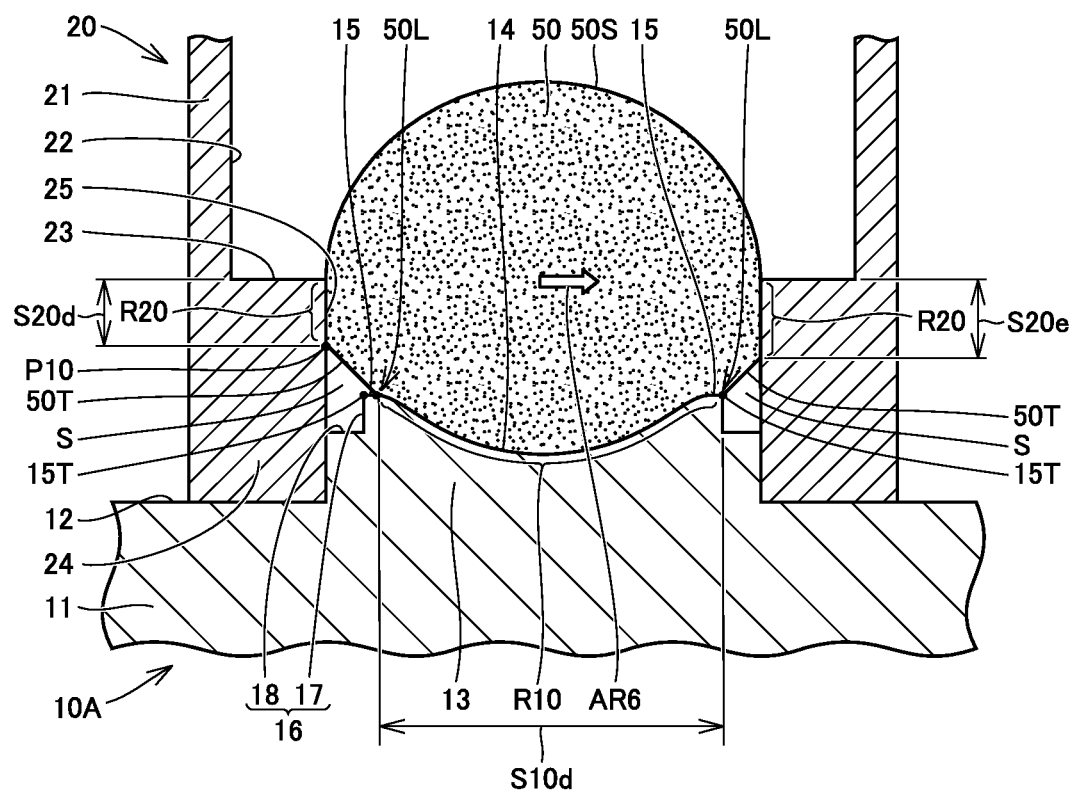
FIG. 15 is a cross-sectional view showing dropping of a molten glass droplet at a position varied to the right of the sheet surface as compared with a position of dropping of the molten glass droplet shown in FIG. 12, in the first embodiment.

FIG. 15 is a cross-sectional view showing dropping of molten glass droplet 50 at a position varied to the right of the sheet surface (in the direction shown with arrow AR6) as compared with the position of dropping of molten glass droplet 50 shown in FIG. 12. As a position of dropping of molten glass droplet 50 varies in the direction shown with arrow AR6, gap S is formed in an unbalanced shape. A size of gap S on the left of the sheet surface is greater and a size of gap S on the right of the sheet surface is smaller.

When a position of dropping of molten glass droplet 50 varies in the direction shown with arrow AR6, contact region R10 between molten glass droplet 50 and lower die 10A has an area S10d. Area S10d may be smaller than (a state shown in FIG. 15) or equal to area S10 in FIG. 12. FIG. 15 illustrates lower end 50L of tapered surface 50T located on the left of the sheet surface being located on the inner side of outer edge end portion 15T of lower die 10A and a part of upper end surface 15 of lower die 10A being exposed. Lower end 50L of tapered surface 50T located on the right of the sheet surface is located at outer edge end portion 15T of lower die 10A.

As a position of dropping of molten glass droplet 50 varies in the direction shown with arrow AR6, contact region R20 between molten glass droplet 50 and outer frame 20 has an area S20d on the left of the sheet surface and has an area S20e on the right of the sheet surface. Area S20d is smaller than area S20 in FIG. 12 (the portion on the left of the sheet surface). Area S20e is greater than area S20 in FIG. 12 (the portion on the right of the sheet surface).

In apparatus 200 for manufacturing a glass molded product (see FIG. 7), as a position of dropping on lower die 10A of molten glass droplet 50 varies in the direction shown with arrow AR6, a portion of molten glass droplet 50 on the right of the sheet surface comes in contact with outer frame 20 to a relatively greater extent, and a portion thereof on the left of the sheet surface comes in contact with lower die 10A and outer frame 20 to a relatively lesser extent.

Unlike the comparative example above, in the present embodiment, even when a position of dropping on lower die 10A of molten glass droplet 50 varies in the direction shown with arrow AR6, lower end 50L of tapered surface 50T located on the right of the sheet surface is located at outer edge end portion 15T of lower die 10A.

In the comparative example described above (see FIG. 6), when molten glass droplet 50 is dropped at a desired position, an area of contact between molten glass droplet 50 and lower die 10 has a value of area S10, and when the position is displaced, it has a value of area S10b. In the comparative example described above, both of the position of the lower end of tapered surface 50T on the right of the sheet surface defining area S10b (see FIG. 6) and the position of the lower end of tapered surface 50T on the left of the sheet surface are likely to be affected by variation in position of dropping on lower die 10 of molten glass droplet 50 (likely to vary).

In contrast, in the present embodiment, even when a position of dropping on lower die 10A of molten glass droplet 50 varies, a position of tapered surface 50T (lower end 50L) on the right of the sheet surface defining area S10d (see FIG. 15) is less likely to be affected and less likely to vary. Only a position of tapered surface 50T (lower end 50L) on the left of the sheet surface defining area S10d is likely to be affected (likely to vary) with variation in position of dropping on lower die 10A of molten glass droplet 50.

As described above, FIG. 15 illustrates lower end 50L of tapered surface 50T located on the left of the sheet surface being located on the inner side of outer edge end portion 15T of lower die 10A and a part of upper end surface 15 of lower die 10A being exposed. This is an illustration of a case that a position of dropping on lower die 10A of molten glass droplet 50 has extremely varied. Actually, as molten glass droplet 50 wet-spreads, molten glass droplet 50 covers the entire surface of optical surface 14 and upper end surface 15 in many cases. In this case, area S10d is the same in value as area S10 in FIG. 12.

Therefore, in apparatus 200 for manufacturing a glass molded product (see FIG. 7), even when a position of dropping on lower die 10A of molten glass droplet 50 varies, an area of contact between molten glass droplet 50 and lower die 10A hardly varies. Only an area of contact between molten glass droplet 50 and outer frame 20 varies. In the comparative example above, when a position of dropping of molten glass droplet 50 varies, not only an area of contact between molten glass droplet 50 and lower die 10 varies but also an area of contact between molten glass droplet 50 and outer frame 20 also varies.

In apparatus 200 for manufacturing a glass molded product, even when a position of dropping of molten glass droplet 50 varies, an area of contact between molten glass droplet 50 and lower die 10A is less likely to vary and a quantity of heat of molten glass droplet 50 removed by lower die 10A hardly changes. According to the method of manufacturing a glass molded product with the use of apparatus 200 for manufacturing a glass molded product, even when a position of dropping varies, as compared with the method of manufacturing a glass molded product with the use of apparatus 100 for manufacturing a glass molded product, generation of individual difference in performance among a plurality of glass molded products obtained as finished products can be suppressed.

As described above, according to the method of manufacturing a glass molded product in the present embodiment with the use of apparatus 200 for manufacturing a glass molded product, generation of individual difference in performance among a plurality of glass molded products obtained as finished products can be suppressed.

As described above, lower die 10A in the present embodiment has a shape in rotation symmetry with respect to the central axis. Since variation in an area of contact between lower die 10A and molten glass droplet 50 is suppressed, unbalance in a transfer surface formed by lower die 10A is suppressed and the transfer surface formed by lower die 10A also has a shape in rotation symmetry. No crack is created in a glass molded article or no poor appearance due to fusion of molten glass droplet 50 to lower die 10A is observed. According to the present embodiment, a high-quality transfer surface (optical surface) can be formed on the side of lower die 10A.

First Modification of First Embodiment

Figure 16:
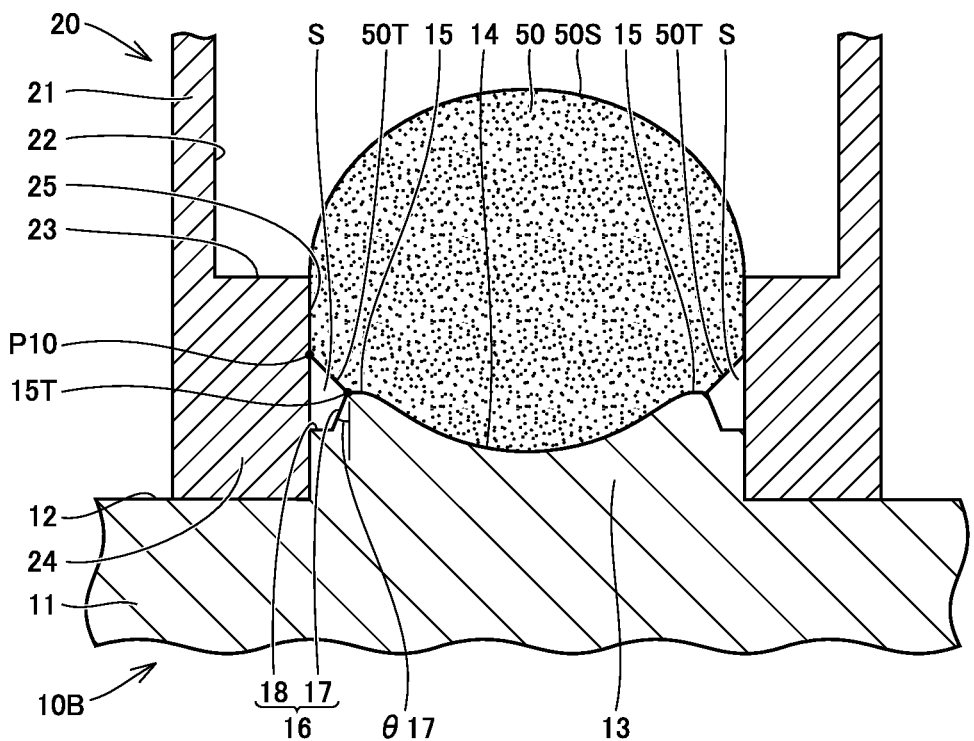
FIG. 16 is a cross-sectional view showing a lower die and the outer frame of the apparatus for manufacturing a glass molded product used in the method of manufacturing a glass molded product in a first modification of the first embodiment.

Referring to FIG. 16, in the first embodiment described above (see FIG. 8), standing wall surface 17 provided in lower die 10A extends along the direction of gravity. As seen in a lower die 10B shown in FIG. 16, standing wall surface 17 may extend diagonally downward away from outer edge end portion 15T of upper end surface 15 with outer edge end portion 15T being defined as a starting point. An angle of inclination θ17 of standing wall surface 17 with respect to the direction of gravity is desirably from 0° to 45°. According to such a structure, good gap S can appropriately be formed around the lower side of molten glass droplet 50 and above space forming surface 16.

Second Modification of First Embodiment

Figure 17:
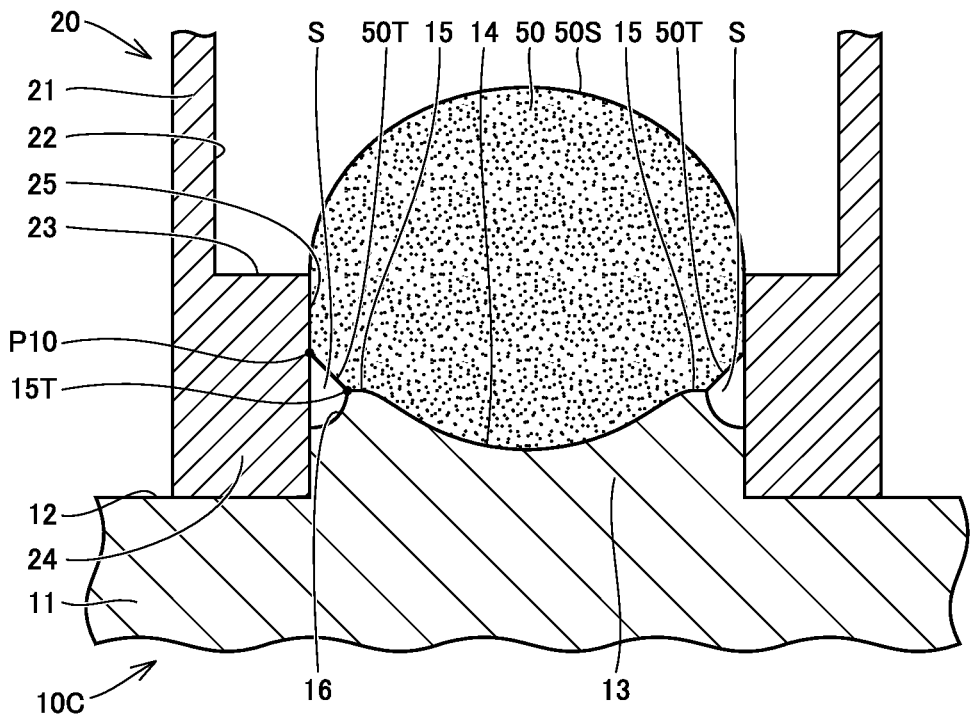
FIG. 17 is a cross-sectional view showing a lower die and the outer frame of the apparatus for manufacturing a glass molded product used in the method of manufacturing a glass molded product in a second modification of the first embodiment.

As seen in a lower die 10C shown in FIG. 17, space forming surface 16 may have a curved recessed shape. Space forming surface 16 of lower die 10C extends away from outer edge end portion 15T of upper end surface 15 as being curved diagonally downward, with outer edge end portion 15T being defined as a starting point. According to such a structure as well, good gap S can appropriately be formed around the lower side of molten glass droplet 50 and above space forming surface 16.

Third Modification of First Embodiment

Figure 18:
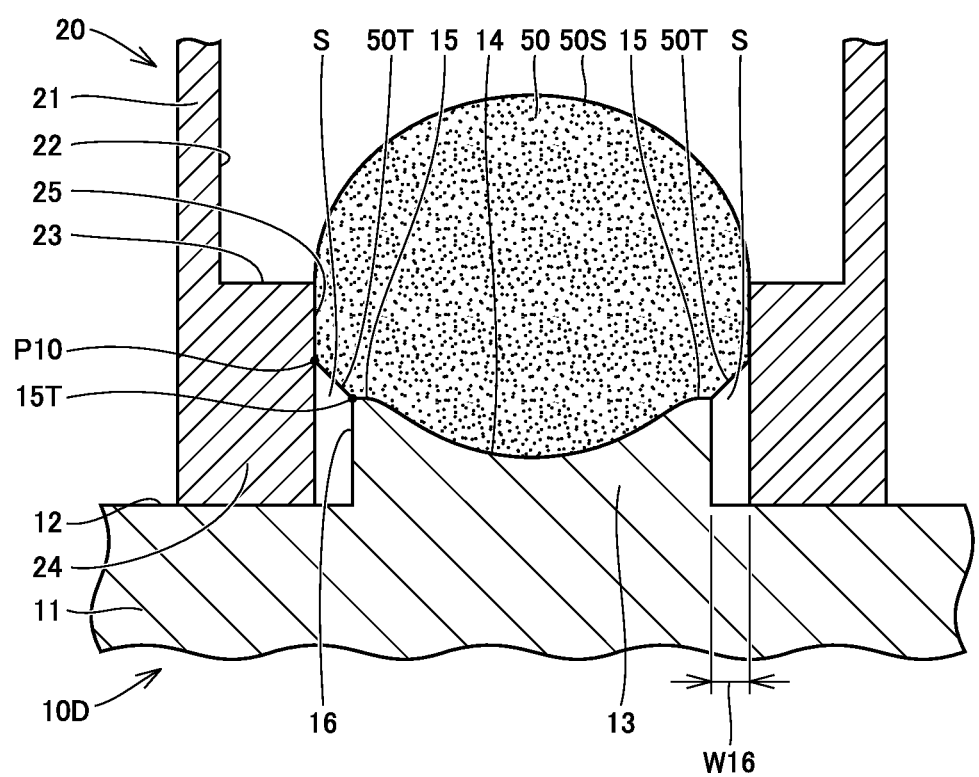
FIG. 18 is a cross-sectional view showing a lower die and the outer frame of the apparatus for manufacturing a glass molded product used in the method of manufacturing a glass molded product in a third modification of the first embodiment.

As seen in a lower die 10D shown in FIG. 18, space forming surface 16 may extend from outer edge end portion 15T of upper end surface 15 toward upper surface 12 of base portion 11 with outer edge end portion 15T being defined as a starting point. In this case, an interval W16 between space forming surface 16 and inner circumferential surface 25 of outer frame 20 is desirably from approximately 50 μm to approximately 300 μm. According to such a structure as well, good gap S can appropriately be formed around the lower side of molten glass droplet 50 and above space forming surface 16.

Second Embodiment

Apparatus 300 for Manufacturing Glass Molded Product

Figure 19:
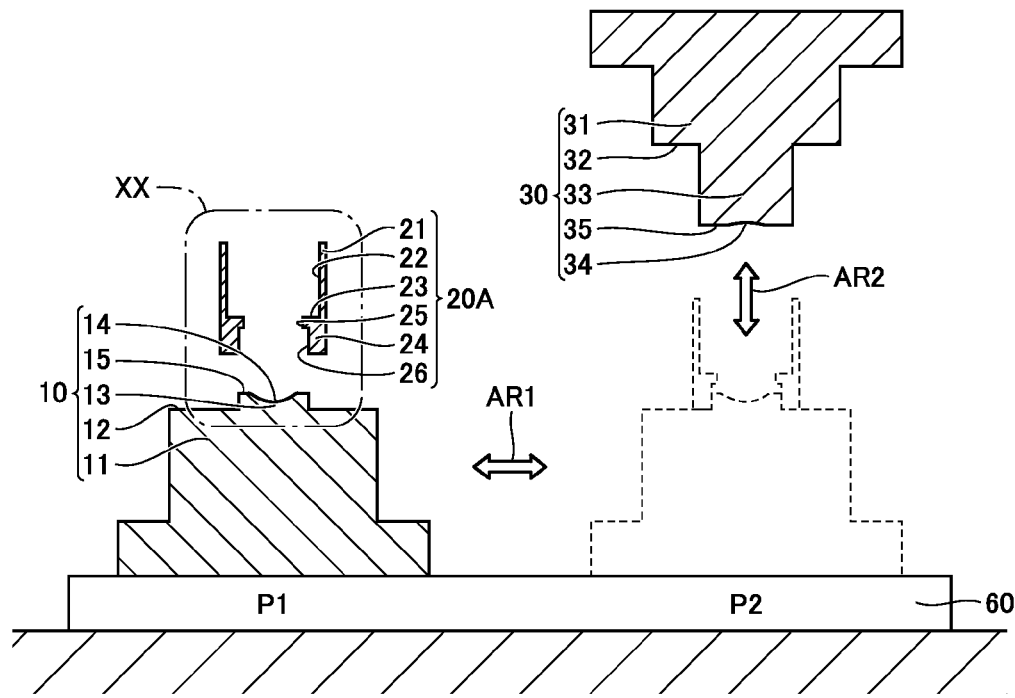
FIG. 19 is a cross-sectional view showing an apparatus for manufacturing a glass molded product used in the method of manufacturing a glass molded product in a second embodiment.

Referring to FIG. 19, in the method of manufacturing a glass molded product in the present embodiment, an apparatus 300 for manufacturing a glass molded product is prepared and used. Apparatus 300 for manufacturing a glass molded product includes lower die 10, an outer frame 20A, upper die 30, and dropping apparatus 40. Lower die 10 and outer frame 20A can function as a lower die for molding glass.

Lower die 10, outer frame 20A, and upper die 30 in the present embodiment have a shape in rotation symmetry with respect to each central axis. Though details will be described later, apparatus 300 for manufacturing a glass molded product obtains a glass molded product by pressurizing and molding molten glass droplet 50 dropped from dropping apparatus 40 toward lower die 10 with the use of lower die 10, outer frame 20A, and upper die 30.

Lower Die 10

Figure 20:
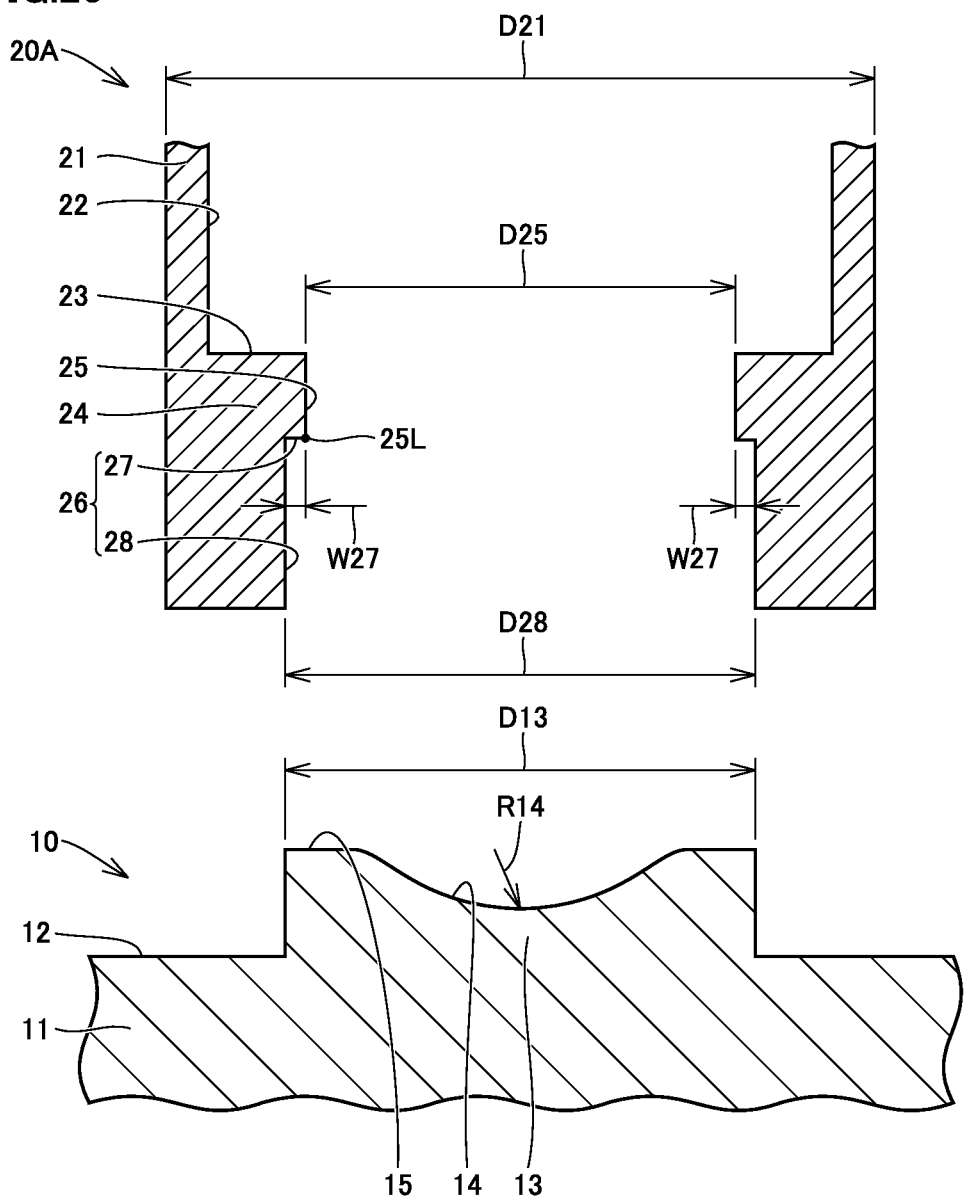
FIG. 20 is a cross-sectional view showing in an enlarged manner, a region surrounded by the line XX in FIG. 19.
Figure 21:
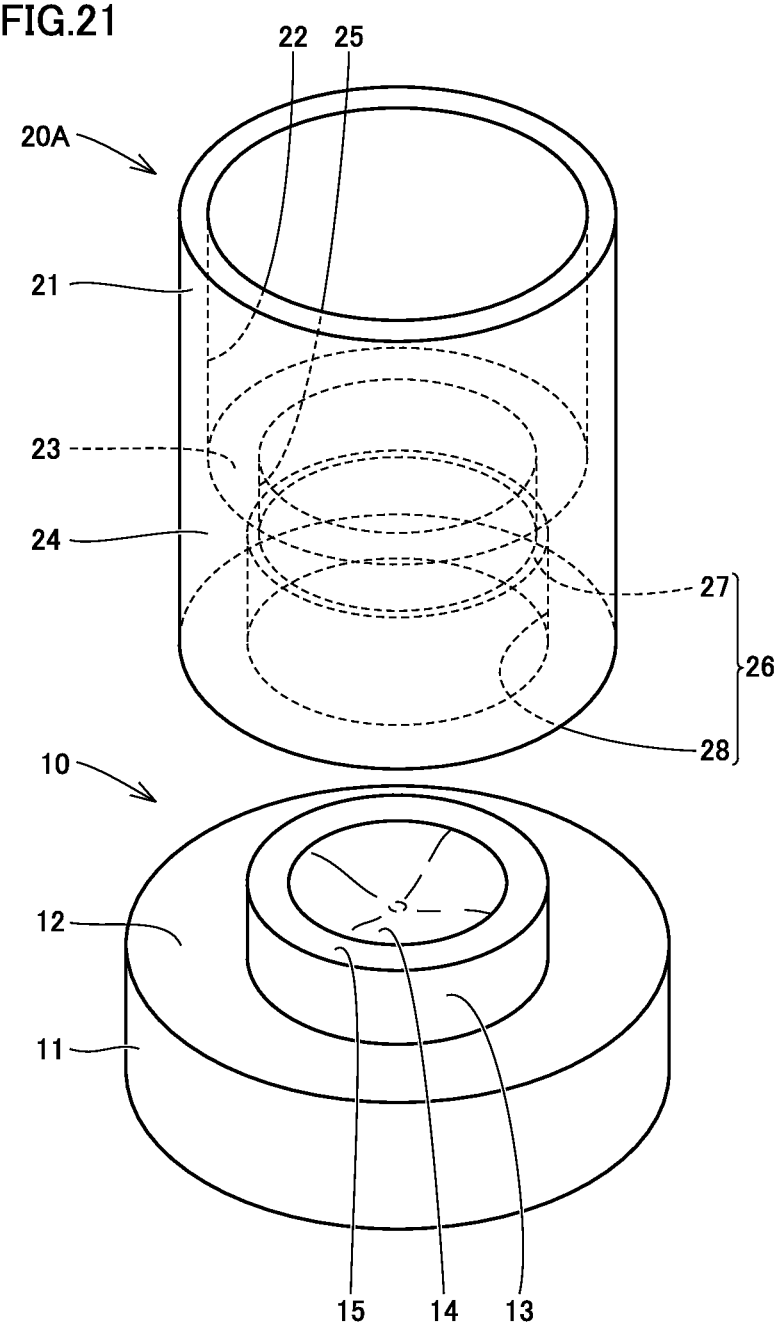
FIG. 21 is a perspective view showing the lower die and an outer frame of the apparatus for manufacturing a glass molded product used in the method of manufacturing a glass molded product in the second embodiment viewed from diagonally above.

FIG. 20 is a cross-sectional view showing in an enlarged manner, a region surrounded by the line XX in FIG. 19. FIG. 21 is a perspective view showing lower die 10 and outer frame 20A viewed from diagonally above.

Referring to FIGS. 19 to 21, lower die 10 in the present embodiment is structured substantially similarly to lower die 10 in the comparative example described above. Specifically, lower die 10 includes base portion 11 and molding portion 13. Molding portion 13 has a columnar shape and protrudes upward from upper surface 12 of base portion 11.

Molding portion 13 has outer diameter D13 (see FIG. 20) of approximately 3.3 mm. Molding portion 13 has optical surface 14 and upper end surface 15 as the lower die surface onto which molten glass droplet 50 is dropped. Upper end surface 15 has a flat shape. Optical surface 14 has a spherical shape and is provided as being recessed in the center of upper end surface 15. Optical surface 14 has radius of curvature R14 of approximately 1.5 mm.

Outer Frame 20A

Outer frame 20A in the present embodiment has a cylindrical shape. Outer frame 20 has outer diameter D21 (see FIG. 20) of approximately 5.0 mm. Outer frame 20A includes large-diameter portion 21 and small-diameter portion 24. Large-diameter portion 21 and small-diameter portion 24 are provided continuously.

Small-diameter portion 24 is located on the side of lower die 10 and large-diameter portion 21 is provided above small-diameter portion 24. On the inner side of large-diameter portion 21, inner circumferential surface 22 is formed. On the inner side of small-diameter portion 24, inner circumferential surface 25 is formed. Inner circumferential surface 22 and inner circumferential surface 25 are both annularly formed.

The inner diameter of inner circumferential surface 22 of large-diameter portion 21 is greater than inner diameter D25 of inner circumferential surface 25 of small-diameter portion 24. Inner circumferential surface 25 has inner diameter D25 of approximately 3.0 mm. Connection surface 23 is provided between inner circumferential surface 22 and inner circumferential surface 25.

Outer frame 20A in the present embodiment further has a space forming surface 26 (a second space forming surface). Space forming surface 26 includes an inner surface 27 extending radially outward away from a lower end portion 25L of inner circumferential surface 25 with lower end portion 25L being defined as a starting point and a standing wall surface 28 extending along the direction of gravity from an outer end portion in a radial direction of inner surface 27. Inner surface 27 and standing wall surface 28 are located on a radially outer side relative to a position in the radial direction where inner circumferential surface 25 is provided. A dimension of projection W27 of inner surface 27 from standing wall surface 28 is approximately 0.15 mm. An inner diameter D28 of standing wall surface 28 is slightly greater than outer diameter D13 (approximately 3.3 mm) of molding portion 13 of lower die 10. When molten glass droplet 50 is dropped, molding portion 13 of lower die 10 has been arranged on the inner side of standing wall surface 28 of outer frame 20A.

Method of Manufacturing Glass Molded Product

Figure 22:
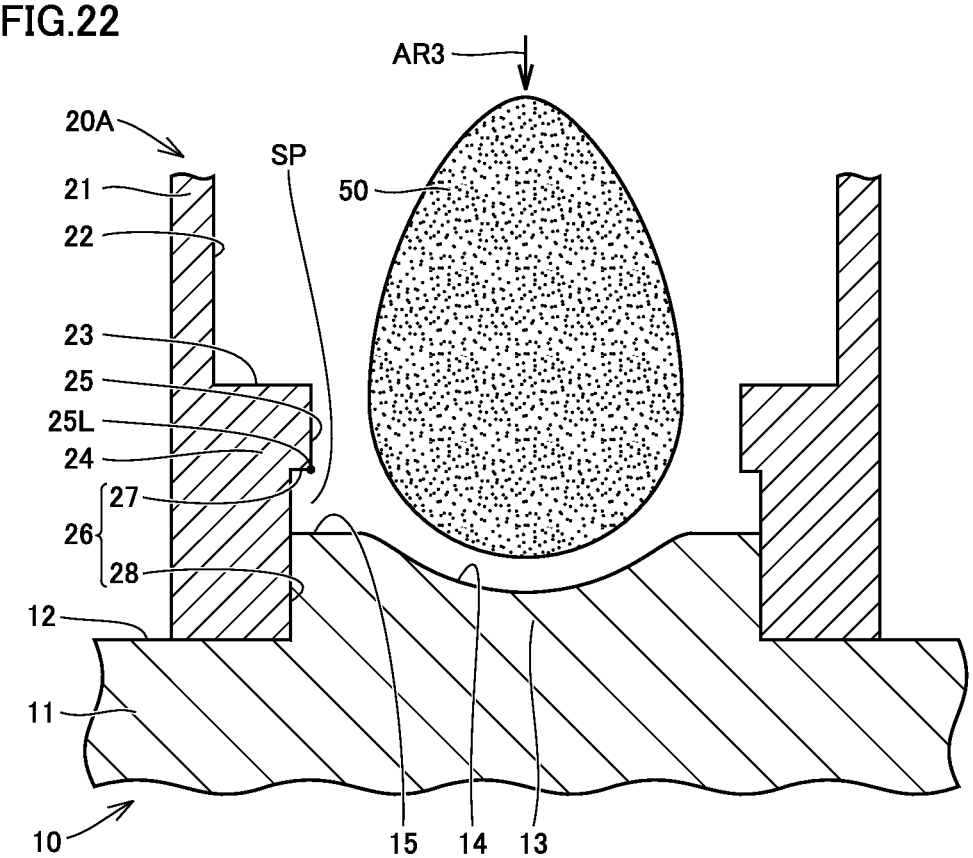
FIG. 22 is a cross-sectional view showing a first step (No. 1) of the method of manufacturing a glass molded product in the second embodiment.

Referring to FIG. 22, in manufacturing a glass molded product, initially, outer frame 20A is arranged on upper surface 12 of lower die 10. Molding portion 13 of lower die 10 is inserted on the inner side of standing wall surface 28 of outer frame 20A. Upper end surface 15 of lower die 10 is located below lower end portion 25L of outer frame 20A and a portion of standing wall surface 28 close to inner surface 27 is exposed. Space SP is formed between upper end surface 15 of lower die 10 and lower end portion 25L of outer frame 20A.

Not-shown heating means heats lower die 10 and upper die 30 (see FIG. 19). Receiving heat from lower die 10, outer frame 20A is heated. Outer frame 20A is heated until a temperature of outer frame 20A reaches a prescribed value. Thereafter, molten glass droplet 50 having a prescribed weight from approximately 0.1 g to approximately 2.0 g is dropped downward from above (see arrow AR3).

Figure 23:
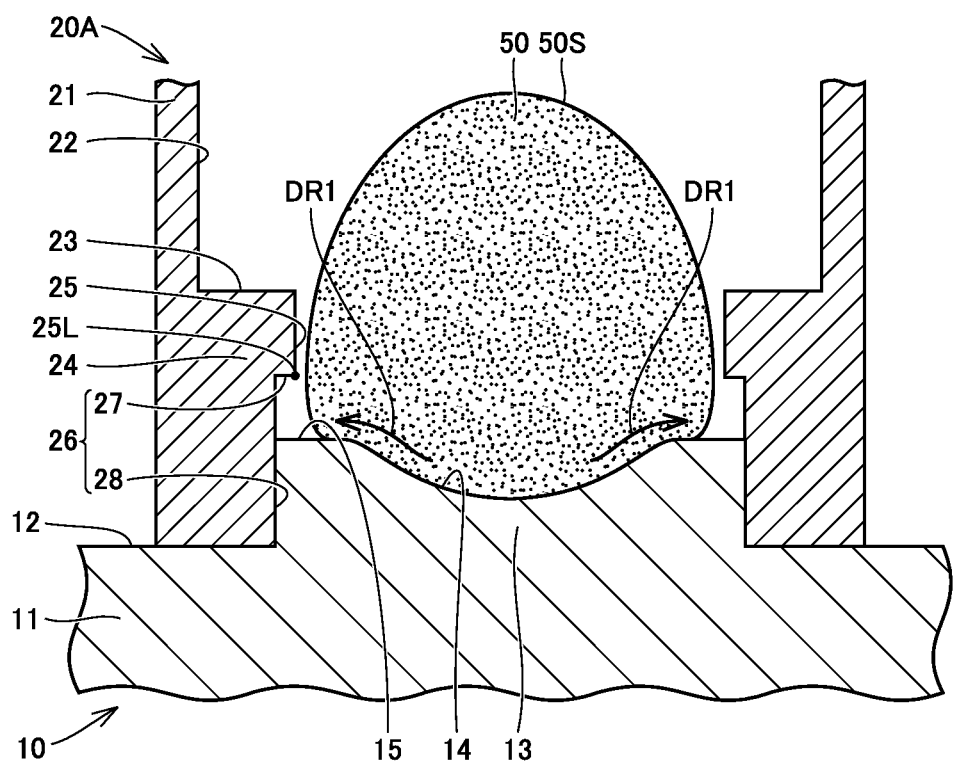
FIG. 23 is a cross-sectional view showing the first step (No. 2) of the method of manufacturing a glass molded product in the second embodiment.

Referring to FIG. 23, molten glass droplet 50 having a prescribed weight comes in contact with optical surface 14 of lower die 10. Molten glass droplet 50 wet-spreads over optical surface 14 radially outward (see arrow DR1) and reaches upper end surface 15 of lower die 10.

Figure 24:
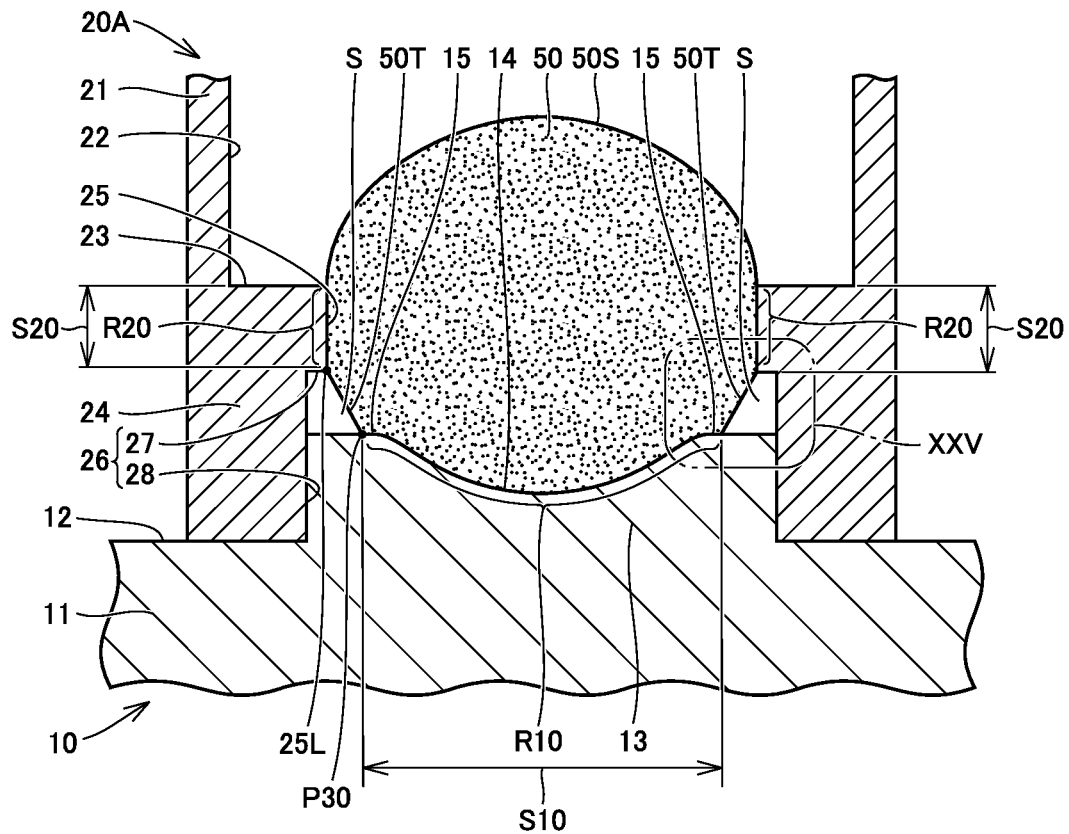
FIG. 24 is a cross-sectional view showing the first step (No. 3) of the method of manufacturing a glass molded product in the second embodiment.

Referring to FIG. 24, an upper portion of molten glass droplet 50 further spreads radially outward and comes in contact with the entire inner circumferential surface 25 of outer frame 20A. Contact region R10 having area S10 is formed between molten glass droplet 50 and lower die 10. Contact region R20 having area S20 is formed between molten glass droplet 50 and outer frame 20A. Molten glass droplet 50 is deprived of heat by lower die 10 and outer frame 20A, a temperature of molten glass droplet 50 rapidly lowers, and solidification of a portion in the vicinity of a bottom surface of the molten glass droplet proceeds.

Upper surface 50S of molten glass droplet 50 forms a substantially spherical shape owing to an action of surface tension. Gap S is formed around the lower side of molten glass droplet 50 and on the radially inner side of space forming surface 26. At the interface between gap S and molten glass droplet 50, tapered surface 50T is formed owing to an action of surface tension of molten glass droplet 50. Gap S is a space surrounded by upper end surface 15 of lower die 10, standing wall surface 28 of outer frame 20A, inner surface 27 of outer frame 20A, and tapered surface 50T of molten glass droplet 50.

Tapered surface 50T (a surface of molten glass droplet 50 dropped onto the lower die surface) connects lower end portion 25L of outer frame 20A and a portion P30 of upper end surface 15 of lower die 10 which is located on the radially inner side relative to a position of lower end portion 25L to each other. The portion of molten glass droplet 50 on the radially inner side of lower end portion 25L does not further spread radially outward of lower end portion 25L owing to an action of surface tension of molten glass droplet 50, and does not wet-spread over space forming surface 26.

Figure 25:
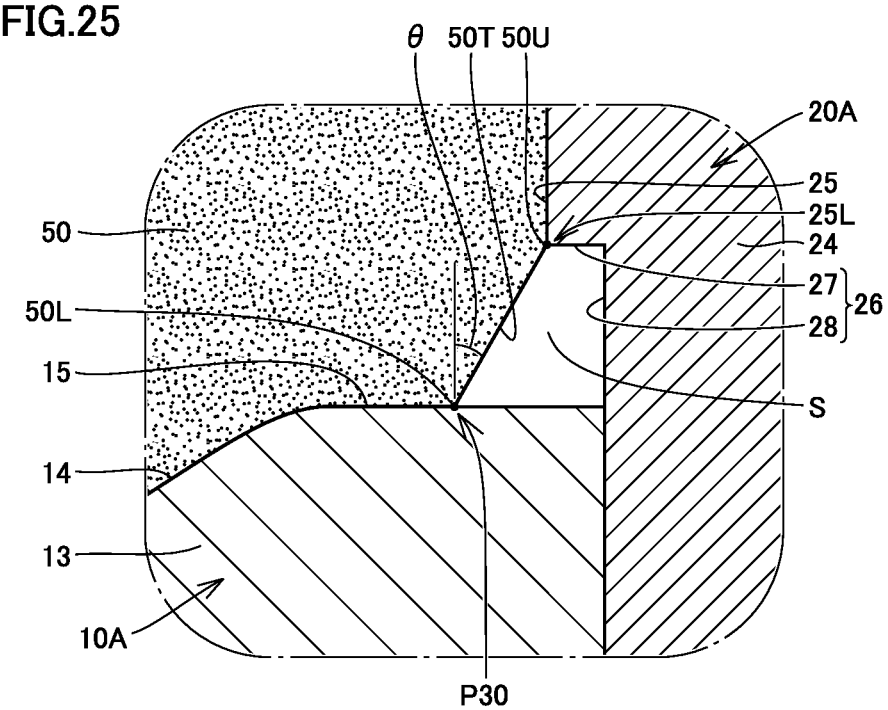
FIG. 25 is a cross-sectional view showing in an enlarged manner, a region surrounded by the line XXV in FIG. 24.

FIG. 25 is a cross-sectional view showing in an enlarged manner, a region surrounded by the line XXV in FIG. 24. Preferably, a prescribed amount of molten glass droplet 50 is desirably dropped onto optical surface 14 such that angle θ formed with respect to the direction of gravity by the straight line connecting upper end 50U and lower end 50L of tapered surface 50T (specifically, tapered surface 50T connecting lower end portion 25L of outer frame 20A and portion P30 of upper end surface 15 of lower die 10 located on the radially inner side relative to the position of lower end portion 25L to each other) to each other is not smaller than 20° and smaller than 45°.

Since the prescribed amount here is different depending on various conditions such as a type of glass of molten glass droplet 50, a material for lower die 10, a shape and a size of optical surface 14, a shape and a size of upper end surface 15, a material for outer frame 20A, and a shape and a size of inner circumferential surface 25, it is desirably calculated in advance through experiments. As molten glass droplet 50 having such a prescribed amount is dropped onto optical surface 14, good gap S can appropriately be formed around the lower side of molten glass droplet 50 and on the radially inner side of space forming surface 26. Lowering in temperature of molten glass droplet 50 more than necessary during pressurization and molding with the use of upper die 30 can also be suppressed.

As in the comparative example described above (see FIG. 3), lower die 10 which has received molten glass droplet 50 moves from position of dropping P1 (see FIG. 19) to position of pressurization P2 (see FIG. 19). Thereafter, molten glass droplet 50 is pressurized and molded by lower die 10, outer frame 20A, and upper die 30. At the time when glass is pressurized and molded by upper die 30, glass has solidified to some extent and hence glass does not enter gap S.

After upper die 30 has moved upward, the glass molded product obtained from molten glass droplet 50 is collected by using not-shown suction means. Outer frame 20A may be removed from the glass molded product as necessary or may be employed as a part of a component together with the glass molded product as necessary. In a case that the method of manufacturing a glass molded product is continuously performed, molten glass droplet 50 is again supplied onto lower die 10 which has moved to position of dropping P1 and the steps the same as above are repeated. The method of manufacturing a glass molded product in the present embodiment is configured as above.

Increase or Decrease in Weight of Drop

It is difficult to set a weight of molten glass droplet 50 dropped from dropping nozzle 46 (see FIG. 19) each time of pressurization and molding to exactly the same value for each time of dropping.

Figure 26:
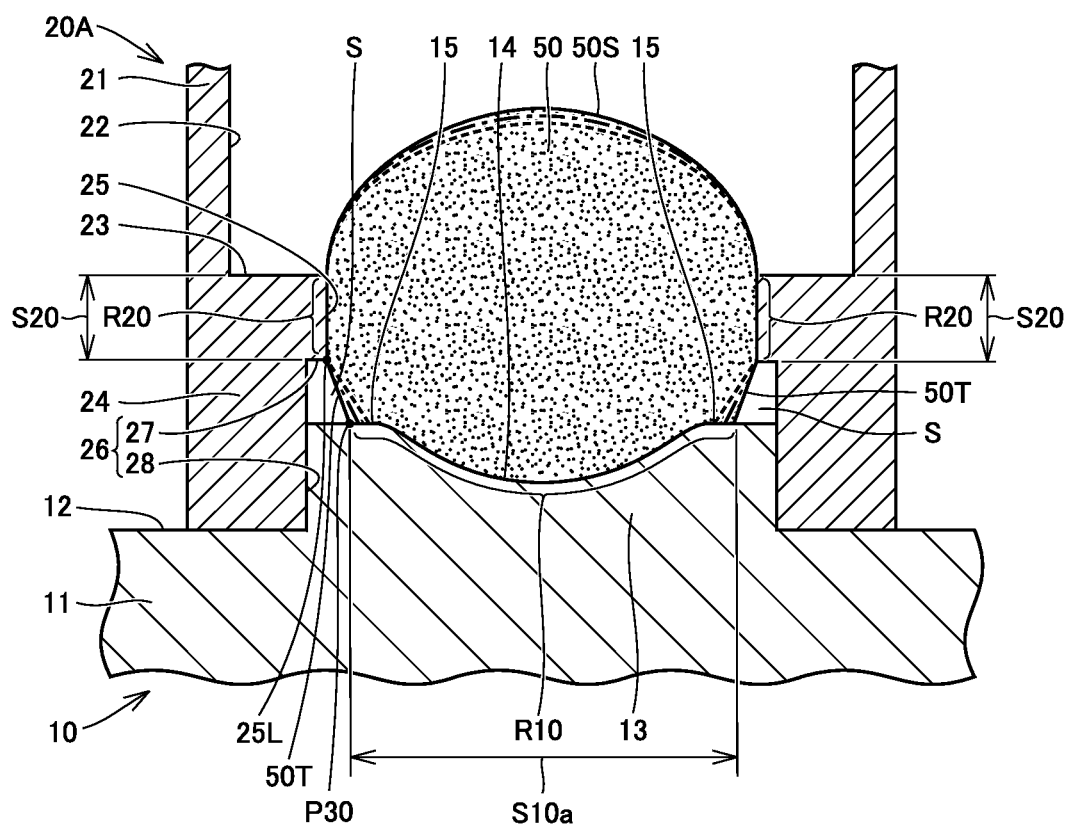
FIG. 26 is a cross-sectional view showing supply of a molten glass droplet greater in weight than a molten glass droplet shown in FIG. 24 onto the lower die in the second embodiment.

FIG. 26 is a cross-sectional view showing supply of molten glass droplet 50 greater in weight than molten glass droplet 50 shown in FIG. 24 onto lower die 10. When a weight of dropped molten glass droplet 50 increases, gap S becomes smaller. Tapered surface 50T is inclined toward the direction of gravity with lower end portion 25L being defined as a starting point. A chain dotted line shown in FIG. 26 corresponds to the position in FIG. 24 where tapered surface 50T is formed.

Unlike the comparative example above, in the present embodiment, even when a weight of dropped molten glass droplet 50 increases, contact region R20 between molten glass droplet 50 and outer frame 20A has area S20. Area S20 is the same in value as area S20 in FIG. 24. In other words, even when a weight of dropped molten glass droplet 50 increases, area S20 of contact between molten glass droplet 50 and outer frame 20A does not vary.

When a weight of dropped molten glass droplet 50 increases, contact region R10 between molten glass droplet 50 and lower die 10 has area S10a. Area S10a is greater than area S10 in FIG. 24.

In apparatus 300 for manufacturing a glass molded product (see FIG. 19), when a weight of dropped molten glass droplet 50 increases, an area of contact between molten glass droplet 50 and outer frame 20A does not vary (area S10→area S10) and only an area of contact between molten glass droplet 50 and lower die 10 increases (area S10→area S10a).

A dotted line in FIG. 26 shows a position of tapered surface 50T formed at the time when molten glass droplet 50 smaller in weight than molten glass droplet 50 shown in FIG. 24 is supplied onto lower die 10.

As can be read based on the position of tapered surface 50T shown with the dotted line, in apparatus 300 for manufacturing a glass molded product (see FIG. 7), as a weight of dropped molten glass droplet 50 decreases, an area of contact between molten glass droplet 50 and outer frame 20A does not vary but only an area of contact between molten glass droplet 50 and lower die 10 decreases.

Therefore, in apparatus 300 for manufacturing a glass molded product (see FIG. 19), even when a weight of dropped molten glass droplet 50 dropped from dropping nozzle 46 (see FIG. 19) increases or decreases, an area of contact between molten glass droplet 50 and outer frame 20A does not vary. Only an area of contact between molten glass droplet 50 and lower die 10 varies. In the comparative example described above, when a weight of dropped molten glass droplet 50 increases or decreases, not only an area of contact between molten glass droplet 50 and lower die 10 varies but also an area of contact between molten glass droplet 50 and outer frame 20 also varies.

In apparatus 300 for manufacturing a glass molded product, even when a weight of dropped molten glass droplet 50 increases or decreases, an area of contact between molten glass droplet 50 and outer frame 20A is less likely to vary and a quantity of heat of molten glass droplet 50 removed by outer frame 20A hardly changes. According to the method of manufacturing a glass molded product with the use of apparatus 300 for manufacturing a glass molded product, even when a weight of drop increases or decreases, as compared with the method of manufacturing a glass molded product with the use of apparatus 100 for manufacturing a glass molded product, generation of individual difference in performance among a plurality of glass molded products obtained as finished products can be suppressed.

Variation in Position of Dropping

It is difficult to set a position of dropping on lower die 10 of molten glass droplet 50 dropped from dropping nozzle 46 (see FIG. 19) each time of pressurization and molding to exactly the same value for each time of dropping.

Figure 27:
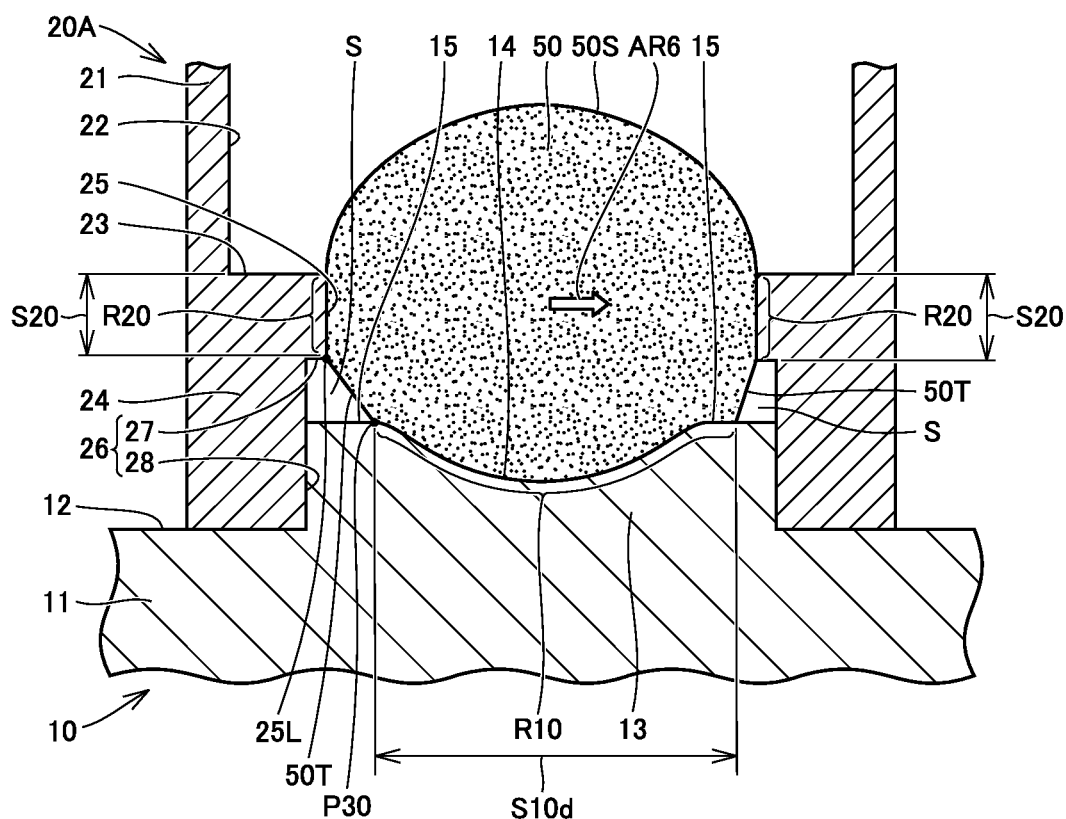
FIG. 27 is a cross-sectional view showing dropping of a molten glass droplet at a position varied to the right of the sheet surface as compared with a position of dropping of the molten glass droplet shown in FIG. 24, in the second embodiment.

FIG. 27 is a cross-sectional view showing dropping of molten glass droplet 50 at a position varied to the right of the sheet surface (in the direction shown with arrow AR6) as compared with the position of dropping of molten glass droplet 50 shown in FIG. 24. As a position of dropping of molten glass droplet 50 varies in the direction shown with arrow AR6, gap S is formed in an unbalanced shape. A size of gap S on the left of the sheet surface is greater and a size of gap S on the right of the sheet surface is smaller.

In apparatus 300 for manufacturing a glass molded product (see FIG. 19), as a position of dropping on lower die 10 of molten glass droplet 50 varies in the direction shown with arrow AR6, a portion of molten glass droplet 50 on the right of the sheet surface comes in contact with lower die 10 to a relatively greater extent, and a portion thereof on the left of the sheet surface comes in contact with lower die 10 to a relatively lesser extent.

When a position of dropping of molten glass droplet 50 varies in the direction shown with arrow AR6, contact region R10 between molten glass droplet 50 and lower die 10 has area S10d. Area S10d may be smaller or greater than area S10 in FIG. 24.

Unlike the comparative example above, in the present embodiment, even when a position of dropping of molten glass droplet 50 varies in the direction shown with arrow AR6, contact region R20 between molten glass droplet 50 and outer frame 20A has area S20 on the left of the sheet surface and has area S20 also on the right of the sheet surface. Area S20 is the same in value as area S20 in FIG. 24. In other words, even when a position of dropping on lower die 10 of molten glass droplet 50 varies in the direction shown with arrow AR6, area S20 of contact between molten glass droplet 50 and outer frame 20A does not vary.

Therefore, in apparatus 300 for manufacturing a glass molded product (see FIG. 19), even when a position of dropping on lower die 10 of molten glass droplet 50 varies, an area of contact between molten glass droplet 50 and outer frame 20A hardly varies. Only an area of contact between molten glass droplet 50 and lower die 10 varies. In the comparative example described above, when a position of dropping of molten glass droplet 50 varies, not only an area of contact between molten glass droplet 50 and lower die 10 varies but also an area of contact between molten glass droplet 50 and outer frame 20 also varies.

In apparatus 300 for manufacturing a glass molded product, even when a position of dropping of molten glass droplet 50 varies, an area of contact between molten glass droplet 50 and outer frame 20A is less likely to vary and a quantity of heat of molten glass droplet 50 removed by outer frame 20A hardly changes. According to the method of manufacturing a glass molded product with the use of apparatus 300 for manufacturing a glass molded product, even when a position of dropping varies, as compared with the method of manufacturing a glass molded product with the use of apparatus 100 for manufacturing a glass molded product, generation of individual difference in performance among a plurality of glass molded products obtained as finished products can be suppressed.

As described above, according to the method of manufacturing a glass molded product in the present embodiment with the use of apparatus 300 for manufacturing a glass molded product, generation of individual difference in performance among a plurality of glass molded products obtained as finished products can be suppressed.

As described above, outer frame 20A in the present embodiment has a shape in rotation symmetry with respect to the central axis. Since variation in an area of contact between outer frame 20A and molten glass droplet 50 is suppressed, unbalance in a transfer surface formed by outer frame 20A is suppressed and the transfer surface formed by outer frame 20A also has a shape in rotation symmetry. No crack is created in a glass molded article or no poor appearance due to fusion of molten glass droplet 50 to outer frame 20A is observed. According to the present embodiment, a high-quality transfer surface (optical surface) can be formed on the side of outer frame 20A.

First Modification of Second Embodiment

Figure 28:
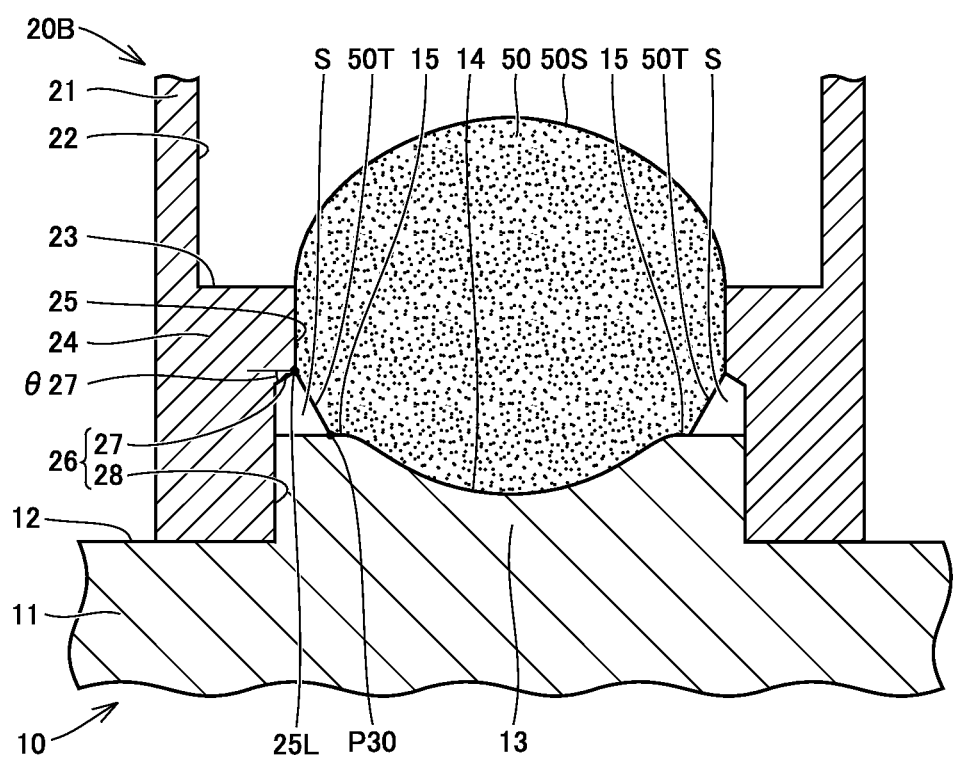
FIG. 28 is a cross-sectional view showing the lower die and an outer frame of the apparatus for manufacturing a glass molded product used in the method of manufacturing a glass molded product in a first modification of the second embodiment.

Referring to FIG. 28, in the second embodiment described above (see FIG. 24), inner surface 27 provided in outer frame 20A extends horizontally. As seen in an outer frame 20B shown in FIG. 28, inner surface 27 may extend diagonally downward and radially outward away from lower end portion 25L of inner circumferential surface 25, with lower end portion 25L being defined as a starting point. An angle of inclination →27 of inner surface 27 with respect to the horizontal direction is desirably from 0° to 45°. According to such a structure, good gap S can appropriately be formed around the lower side of molten glass droplet 50 and on the radially inner side of space forming surface 26.

Second Modification of Second Embodiment

Figure 29:
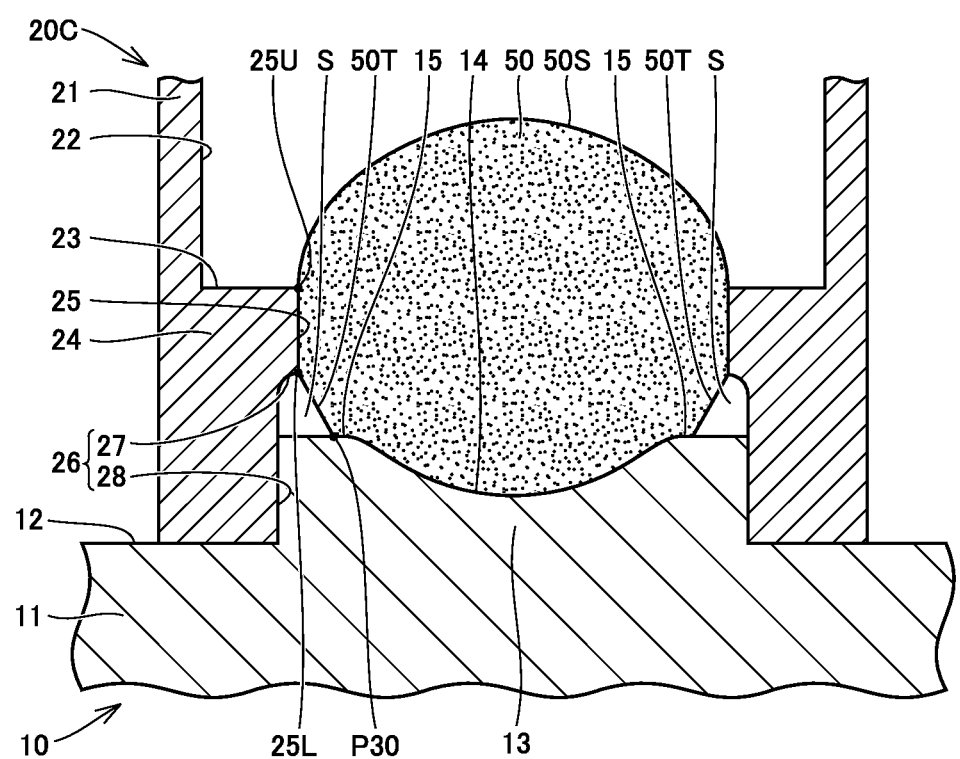
FIG. 29 is a cross-sectional view showing the lower die and an outer frame of the apparatus for manufacturing a glass molded product used in the method of manufacturing a glass molded product in a second modification of the second embodiment.

As seen in an outer frame 20C shown in FIG. 29, space forming surface 26 may have a curved recessed shape. Space forming surface 26 of outer frame 20C extends away from lower end portion 25L of inner circumferential surface 25 as being curved diagonally downward and radially outward, with lower end portion 25L being defined as a starting point. According to such a structure as well, good gap S can appropriately be formed around the lower side of molten glass droplet 50 and on the radially inner side of space forming surface 26.

Third Embodiment

Apparatus 400 for Manufacturing Glass Molded Product

Figure 30:
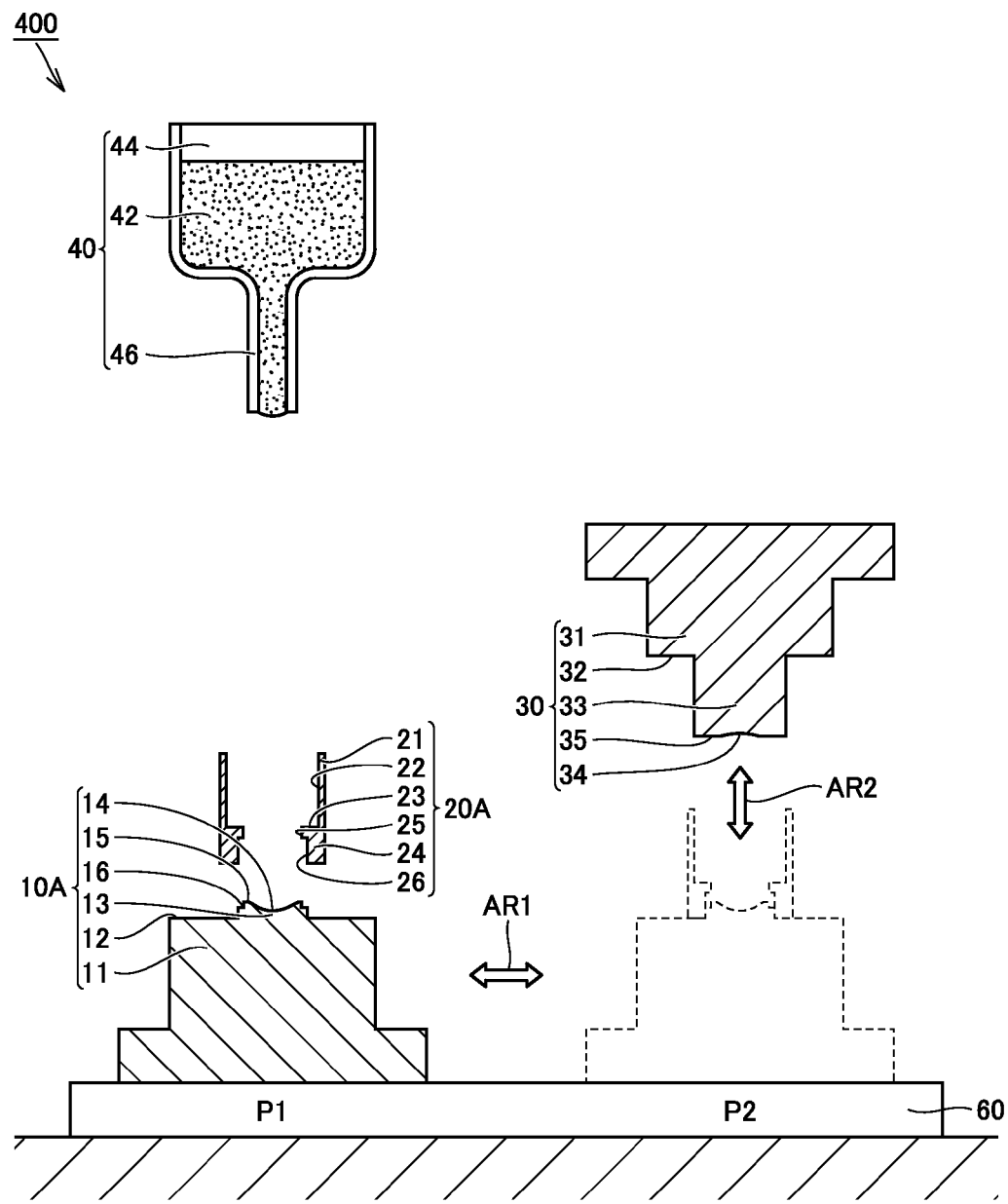
FIG. 30 is a cross-sectional view showing an apparatus for manufacturing a glass molded product used in the method of manufacturing a glass molded product in a third embodiment.

Referring to FIG. 30, in the method of manufacturing a glass molded product in the present embodiment, an apparatus 400 for manufacturing a glass molded product is prepared and used. Apparatus 400 for manufacturing a glass molded product includes lower die 10A, outer frame 20A, upper die 30, and dropping apparatus 40. Lower die 10A and outer frame 20A can function as a lower die for molding glass.

Lower die 10A is structured similarly to lower die 10A in the first embodiment described above. Outer frame 20A is structured similarly to outer frame 20A in the second embodiment described above. Apparatus 400 for manufacturing a glass molded product obtains a glass molded product by pressurizing and molding molten glass droplet 50 dropped from dropping apparatus 40 toward lower die 10A with the use of lower die 10A, outer frame 20A, and upper die 30.

Method of Manufacturing Glass Molded Product

Figure 31:
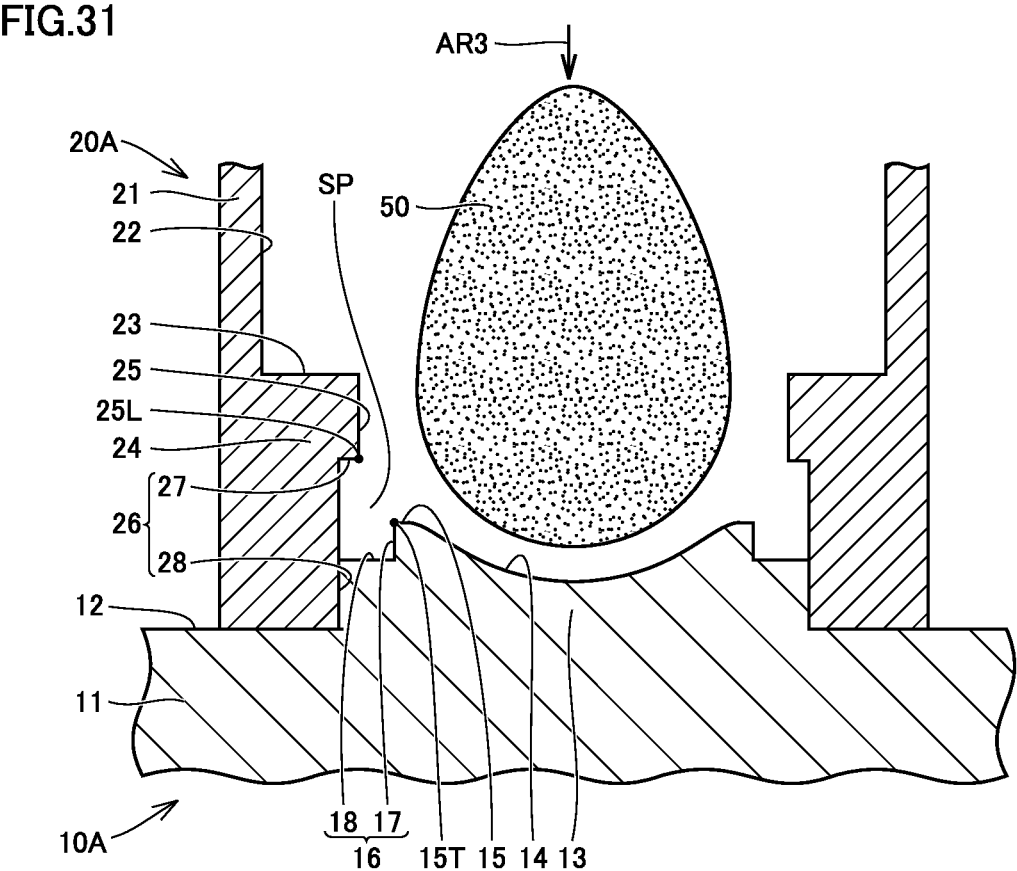
FIG. 31 is a cross-sectional view showing a first step (No. 1) of the method of manufacturing a glass molded product in the third embodiment.

Referring to FIG. 31, in manufacturing a glass molded product, initially, outer frame 20A is arranged on upper surface 12 of lower die 10A. Molding portion 13 of lower die 10A is inserted on the inner side of standing wall surface 28 of outer frame 20A. Outer edge end portion 15T of lower die 10A is located below lower end portion 25L of outer frame 20A and a portion of standing wall surface 28 close to inner surface 27 is exposed. Space SP is formed between outer edge end portion 15T of lower die 10A and inner circumferential surface 25 of outer frame 20A and between upper end surface 15 of lower die 10A and lower end portion 25L of outer frame 20A.

Not-shown heating means heats lower die 10A and upper die 30 (see FIG. 30). Receiving heat from lower die 10A, outer frame 20A is heated. Outer frame 20A is heated until a temperature of outer frame 20A reaches a prescribed value. Thereafter, molten glass droplet 50 having a prescribed weight from approximately 0.1 g to approximately 2.0 g is dropped downward from above (see arrow AR3).

Figure 32:
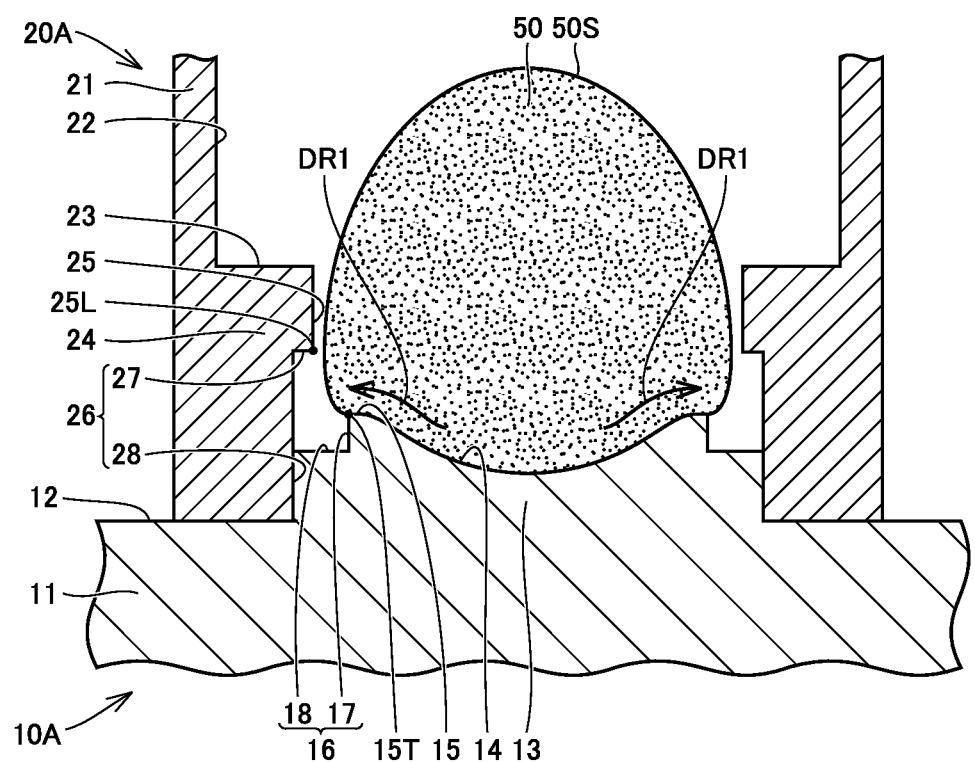
FIG. 32 is a cross-sectional view showing the first step (No. 2) of the method of manufacturing a glass molded product in the third embodiment.

Referring to FIG. 32, molten glass droplet 50 having a prescribed weight comes in contact with optical surface 14 of lower die 10A. Molten glass droplet 50 wet-spreads over optical surface 14 radially outward (see arrow DR1) and successively reaches upper end surface 15 of lower die 10A and outer edge end portion 15T of upper end surface 15.

Preferably, a prescribed amount of molten glass droplet 50 is desirably dropped onto optical surface 14 such that molten glass droplet 50 wet-spreads to reach the entire circumference of outer edge end portion 15T (in other words, molten glass droplet 50 covers the entire surface of optical surface 14 and upper end surface 15). Since the prescribed amount here is different depending on various conditions such as a type of glass of molten glass droplet 50, a material for lower die 10A, a shape and a size of optical surface 14, and a shape and a size of upper end surface 15, it is desirably calculated in advance through experiments.

Figure 33:
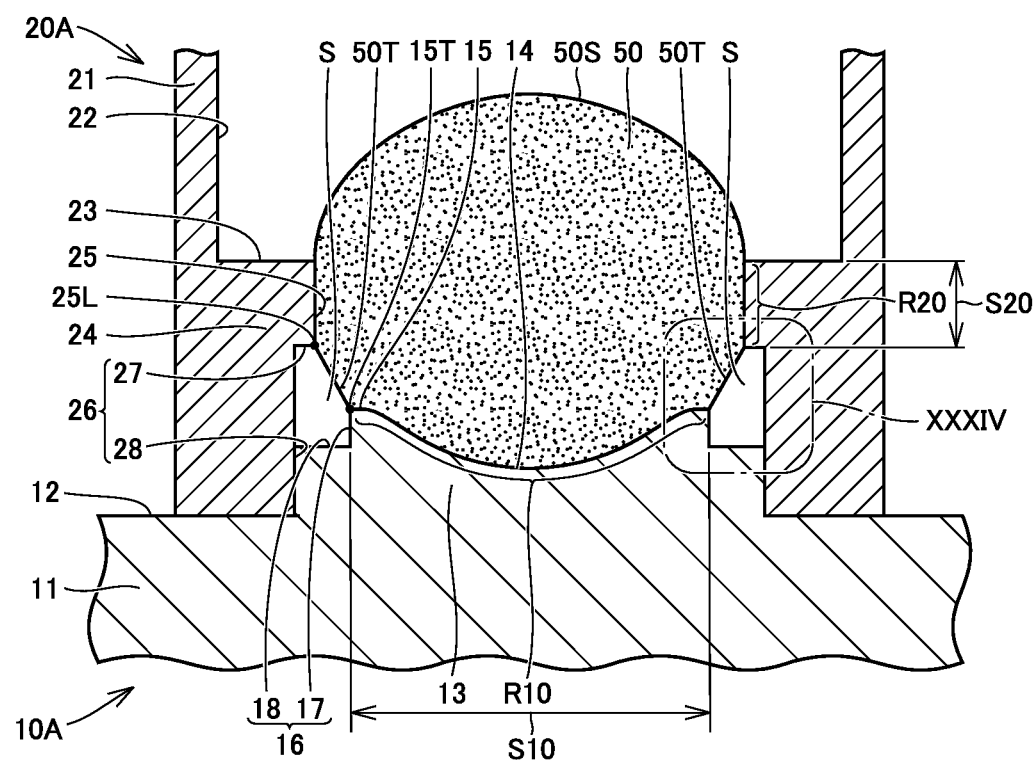
FIG. 33 is a cross-sectional view showing the first step (No. 3) of the method of manufacturing a glass molded product in the third embodiment.

Referring to FIG. 33, an upper portion of molten glass droplet 50 further spreads radially outward and comes in contact with the entire inner circumferential surface 25 of outer frame 20A. Here, a portion of molten glass droplet 50 below outer edge end portion 15T does not further spread radially outward of outer edge end portion 15T, owing to an action of surface tension of molten glass droplet 50.

Contact region R10 having area S10 is formed between molten glass droplet 50 and lower die 10A. Area S10 of contact between molten glass droplet 50 and lower die 10A shown in FIG. 33 and area S10 of contact between molten glass droplet 50 and lower die 10A shown in FIG. 32 are the same in value. In other words, even when a state of molten glass droplet 50 shown in FIG. 32 makes transition to a state of molten glass droplet 50 shown in FIG. 33, area S10 of contact between molten glass droplet 50 and lower die 10A does not vary. Contact region R20 having area S20 is formed between molten glass droplet 50 and outer frame 20A. Molten glass droplet 50 is deprived of heat by lower die 10A and outer frame 20A, a temperature of molten glass droplet 50 rapidly lowers, and solidification of a portion in the vicinity of a bottom surface of the molten glass droplet proceeds.

Upper surface 50S of molten glass droplet 50 forms a substantially spherical shape owing to an action of surface tension. Gap S is formed around the lower side of molten glass droplet 50 and above space forming surface 16, in other words, around the lower side of molten glass droplet 50 and on the radially inner side of space forming surface 26. At the interface between gap S and molten glass droplet 50, tapered surface 50T is formed owing to an action of surface tension of molten glass droplet 50. Gap S is a space surrounded by space forming surface 16 of lower die 10A, space forming surface 26 of outer frame 20A, and tapered surface 50T of molten glass droplet 50.

Tapered surface 50T (a surface of molten glass droplet 50 dropped onto the lower die surface) connects outer edge end portion 15T of lower die 10A and lower end portion 25L of outer frame 20A to each other. A portion of molten glass droplet 50 below outer edge end portion 15T does not further spread radially outward of outer edge end portion 15T owing to an action of surface tension of molten glass droplet 50 and does not wet-spread over space forming surface 16. A portion of molten glass droplet 50 on the radially inner side of lower end portion 25L does not further spread radially outward of lower end portion 25L owing to an action of surface tension of molten glass droplet 50 and does not wet-spread over space forming surface 26.

Figure 34:
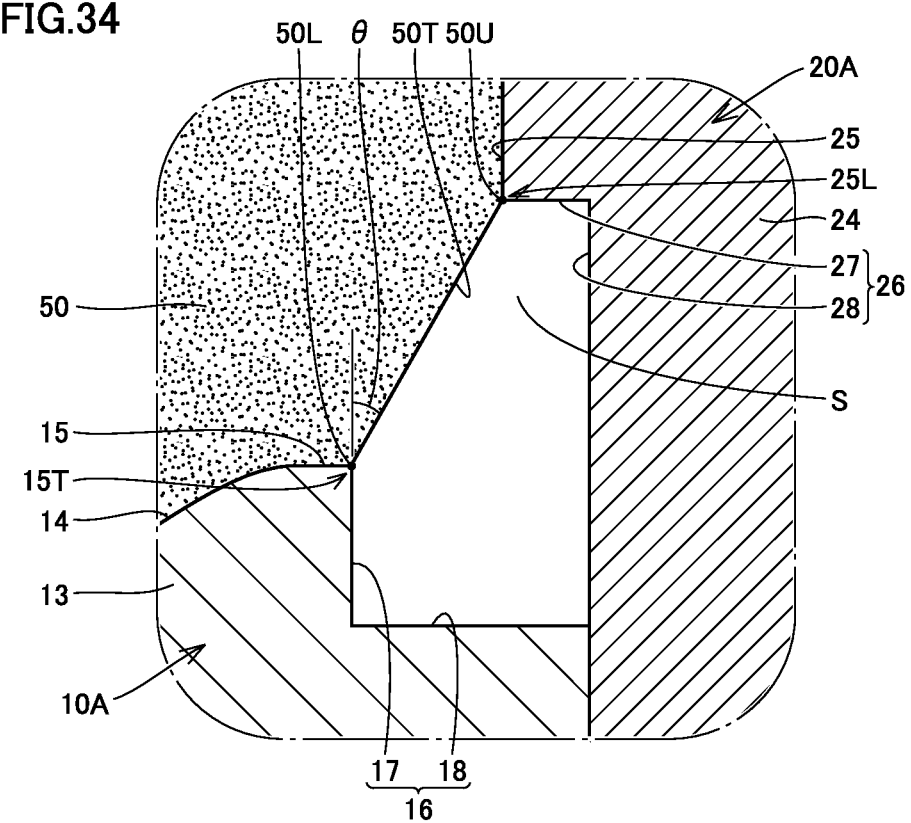
FIG. 34 is a cross-sectional view showing in an enlarged manner, a region surrounded by the line XXXIV in FIG. 33.

FIG. 34 is a cross-sectional view showing in an enlarged manner, a region surrounded by the line XXXIV in FIG. 34. Preferably, a prescribed amount of molten glass droplet 50 is desirably dropped onto optical surface 14 such that angle θ formed with respect to the direction of gravity by the straight line connecting upper end 50U and lower end 50L of tapered surface 50T (specifically, tapered surface 50T connecting lower end portion 25L of outer frame 20A and outer edge end portion 15T of lower die 10A to each other) to each other is not smaller than 20° and smaller than 45°.

Since the prescribed amount here is different depending on various conditions such as a type of glass of molten glass droplet 50, a material for lower die 10A, a shape and a size of optical surface 14, a shape and a size of upper end surface 15, a material for outer frame 20A, and a shape and a size of inner circumferential surface 25, it is desirably calculated in advance through experiments. As molten glass droplet 50 having such a prescribed amount is dropped onto optical surface 14, good gap S can appropriately be formed around the lower side of molten glass droplet 50 and above space forming surface 16, in other words, around the lower side of molten glass droplet 50 and on the radially inner side of space forming surface 26. Lowering in temperature of molten glass droplet 50 more than necessary during pressurization and molding with the use of upper die 30 can also be suppressed.

As in the comparative example described above (see FIG. 3), lower die 10A which has received molten glass droplet 50 moves from position of dropping P1 (see FIG. 30) to position of pressurization P2 (see FIG. 30). Thereafter, molten glass droplet 50 is pressurized and molded by lower die 10A, outer frame 20A, and upper die 30. At the time when glass is pressurized and molded by upper die 30, glass has solidified to some extent and hence glass does not enter gap S.

After upper die 30 has moved upward, the glass molded product obtained from molten glass droplet 50 is collected by using not-shown suction means. Outer frame 20A may be removed from the glass molded product as necessary or may be employed as a part of a component together with the glass molded product as necessary. In a case that the method of manufacturing a glass molded product is continuously performed, molten glass droplet 50 is again supplied onto lower die 10A which has moved to position of dropping P1 and the steps the same as above are repeated. The method of manufacturing a glass molded product in the present embodiment is configured as above.

Increase or Decrease in Weight of Drop

It is difficult to set a weight of molten glass droplet 50 dropped from dropping nozzle 46 (see FIG. 30) each time of pressurization and molding to exactly the same value for each time of dropping.

In the present embodiment, owing to a function the same as in the first embodiment above, even when a weight of dropped molten glass droplet 50 increases or decreases, contact region R10 between molten glass droplet 50 and lower die 10A has area S10. In other words, even when a weight of dropped molten glass droplet 50 increases or decreases, area S10 of contact between molten glass droplet 50 and lower die 10A does not vary.

In the present embodiment, owing to a function the same as in the second embodiment above, even when a weight of dropped molten glass droplet 50 increases or decreases, contact region R20 between molten glass droplet 50 and outer frame 20A has area S20. In other words, even when a weight of dropped molten glass droplet 50 increases or decreases, area S20 of contact between molten glass droplet 50 and outer frame 20A does not vary.

Therefore, in apparatus 400 for manufacturing a glass molded product (see FIG. 30), even when a weight of dropped molten glass droplet 50 dropped from dropping nozzle 46 (see FIG. 30) increases or decreases, an area of contact between molten glass droplet 50 and lower die 10A does not vary and an area of contact between molten glass droplet 50 and outer frame 20A does not vary either. In the comparative example described above, when a weight of dropped molten glass droplet 50 increases or decreases, not only an area of contact between molten glass droplet 50 and lower die 10 varies but also an area of contact between molten glass droplet 50 and outer frame 20 also varies.

In apparatus 400 for manufacturing a glass molded product, even when a weight of dropped molten glass droplet 50 increases or decreases, a quantity of heat of molten glass droplet 50 removed by lower die 10A and outer frame 20A hardly changes. According to the method of manufacturing a glass molded product with the use of apparatus 400 for manufacturing a glass molded product, even when a weight of drop increases or decreases, as compared with the method of manufacturing a glass molded product with the use of apparatus 100 for manufacturing a glass molded product, generation of individual difference in performance among a plurality of glass molded products obtained as finished products can be suppressed.

Variation in Position of Dropping

It is difficult to set a position of dropping on lower die 10A of molten glass droplet 50 dropped from dropping nozzle 46 (see FIG. 30) each time of pressurization and molding to exactly the same value for each time of dropping.

In the present embodiment, owing to a function the same as in the first embodiment above, even when a position of dropping of molten glass droplet 50 varies, contact region R10 between molten glass droplet 50 and lower die 10A has area S10. In other words, even when a position of dropping of molten glass droplet 50 varies, area S10 of contact between molten glass droplet 50 and lower die 10A does not vary.

In the present embodiment, owing to a function the same as in the second embodiment above, even when a position of dropping of molten glass droplet 50 varies, contact region R20 between molten glass droplet 50 and outer frame 20A has area S20. In other words, even when a position of dropping of molten glass droplet 50 varies, area S20 of contact between molten glass droplet 50 and outer frame 20A does not vary.

Therefore, in apparatus 400 for manufacturing a glass molded product (see FIG. 30), even when a position of dropping of molten glass droplet 50 varies, an area of contact between molten glass droplet 50 and lower die 10A does not vary and an area of contact between molten glass droplet 50 and outer frame 20A does not vary either. In the comparative example described above, when a position of dropping of molten glass droplet 50 varies, not only an area of contact between molten glass droplet 50 and lower die 10 varies but also an area of contact between molten glass droplet 50 and outer frame 20 also varies.

In apparatus 400 for manufacturing a glass molded product, even when a position of dropping of molten glass droplet 50 varies, a quantity of heat of molten glass droplet 50 removed by lower die 10A and outer frame 20A hardly changes. According to the method of manufacturing a glass molded product with the use of apparatus 400 for manufacturing a glass molded product, even when a position of dropping varies, as compared with the method of manufacturing a glass molded product with the use of apparatus 100 for manufacturing a glass molded product, generation of individual difference in performance among a plurality of glass molded products obtained as finished products can be suppressed.

As described above, according to the method of manufacturing a glass molded product in the present embodiment with the use of apparatus 400 for manufacturing a glass molded product, generation of individual difference in performance among a plurality of glass molded products obtained as finished products can be suppressed.

As described above, lower die 10A and outer frame 20A in the present embodiment have a shape in rotation symmetry with respect to the central axis. Since variation in an area of contact between lower die 10A and molten glass droplet 50 is suppressed and variation in an area of contact between outer frame 20A and molten glass droplet 50 is suppressed, unbalance in a transfer surface formed by lower die 10A and outer frame 20A is suppressed and the transfer surface formed by lower die 10A and outer frame 20A also has a shape in rotation symmetry. No crack is created in a glass molded article or no poor appearance due to fusion of molten glass droplet 50 to lower die 10A and outer frame 20A is observed. According to the present embodiment, a high-quality transfer surface can be formed on the side of lower die 10A and outer frame 20A.

Though each embodiment and each modification based on the present invention have been described above, each embodiment and each modification disclosed herein are illustrative and non-restrictive in every respect. The technical scope of the present invention is defined by the terms of the claims, and is intended to include any modifications within the scope and meaning equivalent to the terms of the claims.

REFERENCE SIGNS LIST 10, 10A, 10B, 10C, 10D lower die; 11, 31 base portion; 12 upper surface; 13, 33 molding portion; 14, 34 optical surface; 15 upper end surface; 15T outer edge end portion; 16 space forming surface (first space forming surface); 17, 28 standing wall surface; 18 outer surface; 20, 20A, 20B, 20C outer frame; 21 large-diameter portion; 22, 25 inner circumferential surface; 23 connection surface; 24 small-diameter portion; 25L lower end portion; 26 space forming surface (second space forming surface); 27 inner surface; 30 upper die; 32 lower surface; 35 lower end surface; 40 dropping apparatus; 42 molten glass; 44 melt bath; 46 dropping nozzle; 50 molten glass droplet; 50L lower end; 50S surface; 50T tapered surface; 50U upper end; 60 guide; 100, 200, 300, 400 apparatus for manufacturing glass molded product; AR1, AR2, AR3, AR4, AR5, AR6, DR1 arrow; D13, D17, D21 outer diameter; D25, D28 inner diameter; H17 height; P1 position of dropping; P2 position of pressurization; P10, P30 portion; R10, R20 contact region; R12, R22 non-contact region; R14 radius of curvature; S gap; S10, S10a, S10b, S10d, S12, S12a, S12b, S12c, S20, S20a, S20b, S20c, S20d, S20e, S22, S22a, S22b, S22c area (area of contact); SP space; W16 interval; W18 width; and W27 dimension of projection.

The invention claimed is:

1. A method of manufacturing a glass molded product by pressurizing and molding a molten glass droplet dropped downward from above, comprising the steps of:
preparing a lower die including a lower die surface onto which said molten glass droplet is dropped and a first space forming surface formed to extend downward away from an outer edge end portion of said lower die surface, with said outer edge end portion being defined as a starting point;
preparing an outer frame including an annularly formed inner circumferential surface;
arranging said lower die on an inner side of said outer frame so as to form a space between said first space forming surface and said inner circumferential surface;
dropping a prescribed amount of said molten glass droplet onto said lower die surface such that a surface of said molten glass droplet dropped onto said lower die surface connects said outer edge end portion and a portion of said inner circumferential surface located above a position of said outer edge end portion to each other and said molten glass droplet dropped onto said lower die surface does not wet-spread over said first space forming surface, wherein during said dropping there is a span of time at which said molten glass droplet is moving towards said lower die surface due to gravity and in which said molten glass droplet has not contacted said lower die surface; and
pressurizing and molding said molten glass droplet by using said lower die, said outer frame, and an upper die after lapse of a prescribed period of time since drop of said molten glass droplet onto said lower die surface,
said prescribed amount of said molten glass droplet is dropped onto said lower die surface such that said molten glass droplet wet-spreads over said lower die surface and reaches an entire circumference of said outer edge end portion.

2. The method of manufacturing a glass molded product according to claim 1, wherein
said lower die and said outer frame each have a shape in rotation symmetry with respect to each central axis.

3. The method of manufacturing a glass molded product according to claim 1, wherein said dropping is initiated by a dropping nozzle.

4. A method of manufacturing a glass molded product by pressurizing and molding a molten glass droplet dropped downward from above, comprising the steps of:
preparing a lower die including a lower die surface onto which said molten glass droplet is dropped;
preparing an outer frame including an annularly formed inner circumferential surface and a second space forming surface formed to extend outward away from a lower end portion of said inner circumferential surface, with said lower end portion being defined as a starting point;
arranging said lower die on an inner side of said outer frame such that said lower die surface is located below said lower end portion and a space is formed between said lower die surface and said lower end portion;
dropping a prescribed amount of said molten glass droplet onto said lower die surface such that a surface of said molten glass droplet dropped onto said lower end surface connects said lower end portion and a portion of said lower die surface located on said inner side relative to a position of said lower end portion to each other, said molten glass droplet dropped onto said lower end surface comes in contact with the entire part of said inner circumferential surface and said molten glass droplet dropped onto said lower die surface does not wet-spread over said second space forming surface, wherein during said dropping there is a span of time at which said molten glass droplet is moving towards said lower die surface due to gravity and in which said molten glass droplet has not contacted said lower die surface; and
pressurizing and molding said molten glass droplet by using said lower die, said outer frame, and an upper die after lapse of a prescribed period of time since drop of said molten glass droplet onto said lower die surface.

5. The method of manufacturing a glass molded product according to claim 4, wherein
an angle formed with respect to a direction of gravity by a straight line connecting an upper end and a lower end to each other of said surface of said molten glass droplet which connects said lower end portion and said portion of said lower die surface located on said inner side relative to the position of said lower end portion to each other is not smaller than 20° and smaller than 45°.

6. The method of manufacturing a glass molded product according to claim 4, wherein said lower die and said outer frame each have a shape in rotation symmetry with respect to each central axis.

7. The method of manufacturing a glass molded product according to claim 4, wherein said dropping is initiated by a dropping nozzle.

8. A method of manufacturing a glass molded product by pressurizing and molding a molten glass droplet dropped downward from above, comprising the steps of:
   preparing a lower die including a lower die surface onto which said molten glass droplet is dropped and a first space forming surface formed to extend downward away from an outer edge end portion of said lower die surface, with said outer edge end portion being defined as a starting point;
   preparing an outer frame including an annularly formed inner circumferential surface and a second space forming surface formed to extend outward away from a lower end portion of said inner circumferential surface, with said lower end portion being defined as a starting point;
   arranging said lower die on an inner side of said outer frame such that said outer edge end portion is located below said lower end portion and a space is formed between said outer edge end portion and said inner circumferential surface and between said lower die surface and said lower end portion;
   dropping a prescribed amount of said molten glass droplet onto said lower die surface such that a surface of said molten glass droplet dropped onto said lower die surface connects said outer edge end portion and said lower end portion to each other, said molten glass droplet dropped onto said lower end surface covers the entire surface of said lower die surface, said molten glass droplet dropped onto said lower end surface comes in contact with the entire part of said inner circumferential surface and said molten glass droplet dropped onto said lower die surface does not wet-spread over any of said first space forming surface and said second space forming surface, wherein during said dropping there is a span of time at which said molten glass droplet is moving towards said lower die surface due to gravity and in which said molten glass droplet has not contacted said lower dies surface; and
   pressurizing and molding said molten glass droplet by using said lower die, said outer frame, and an upper die after lapse of a prescribed period of time since drop of said molten glass droplet onto said lower die surface.

9. The method of manufacturing a glass molded product according to claim 8, wherein said lower die and said outer frame each have a shape in rotation symmetry with respect to each central axis.

10. The method of manufacturing a glass molded product according to claim 8, wherein said dropping is initiated by a dropping nozzle.

* * * * *